Nov. 17, 1970   T. R. THOMPSON   3,541,519
DATA CAPTURE

Filed Nov. 7, 1967   28 Sheets-Sheet 1

Inventor
Thomas Raymond Thompson
By
Cushman, Darby & Cushman
attys.

Nov. 17, 1970  T. R. THOMPSON  3,541,519
DATA CAPTURE
Filed Nov. 7, 1967  28 Sheets-Sheet 2
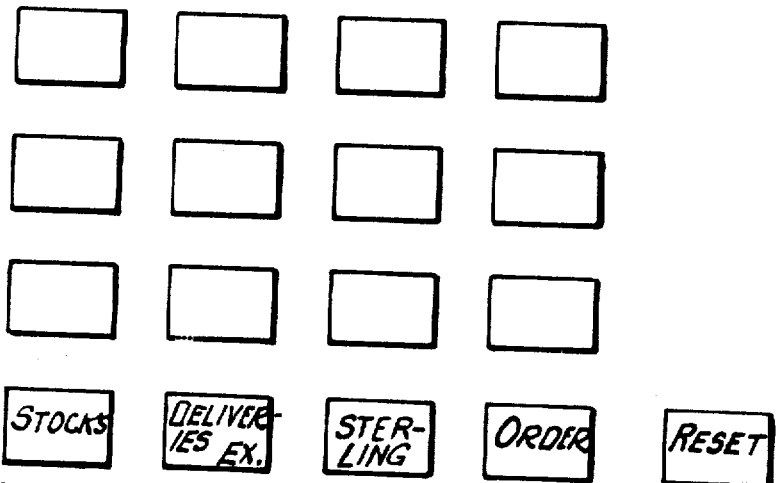
FIG. 3. TRANSACTION BUTTONS
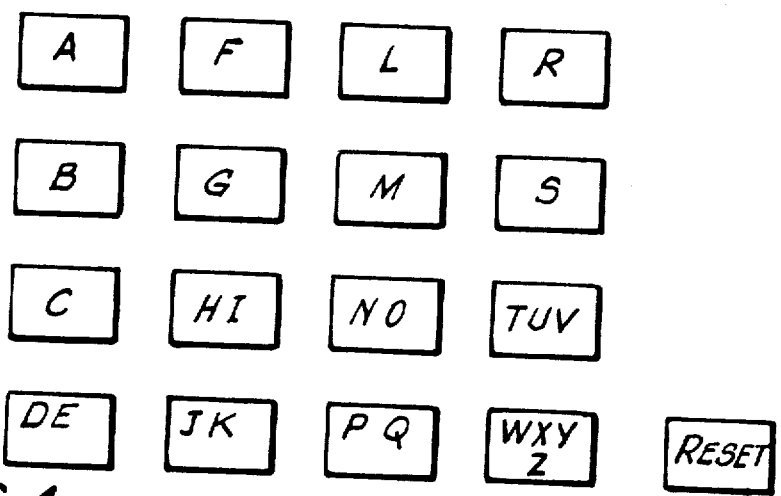
FIG. 4. CUSTOMER GROUP SELECTION
INVENTOR
Thomas Raymond Thompson
BY
Cushman, Darby & Cushman
ATTORNEYS Nov. 17, 1970   T. R. THOMPSON   3,541,519
DATA CAPTURE
Filed Nov. 7, 1967   28 Sheets-Sheet 3
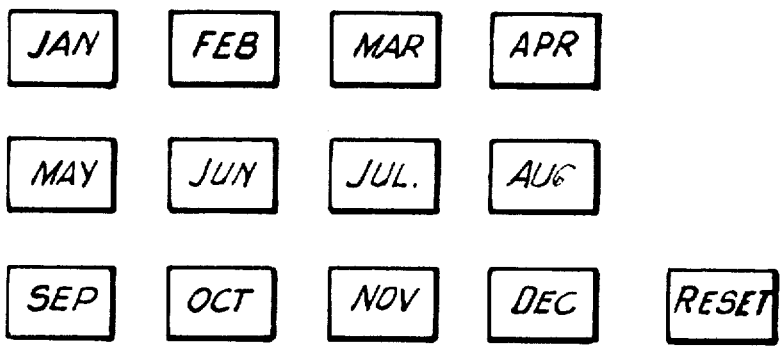
FIG.5.   MONTHS
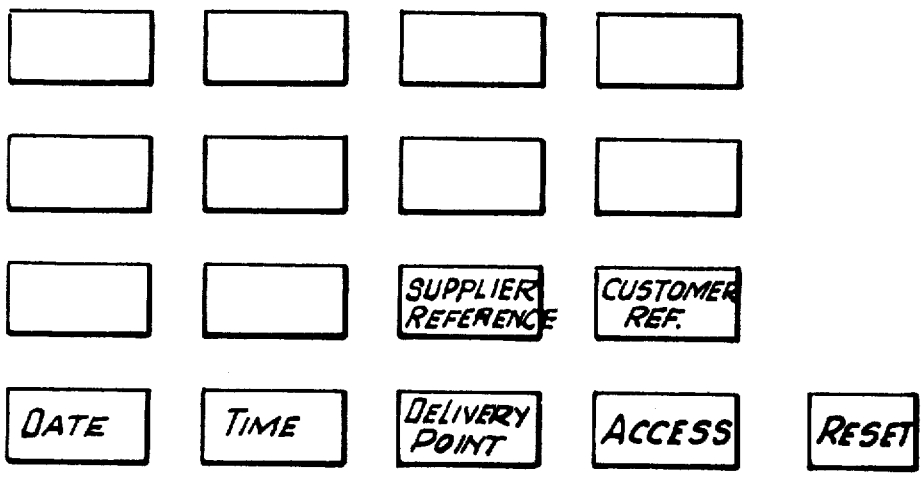
FIG.6.   SPECIAL FEATURES Nov. 17, 1970     T. R. THOMPSON     3,541,519
DATA CAPTURE Filed Nov. 7, 1967     28 Sheets-Sheet 4

FIG. 7.    MISCELLANEOUS DETAILS

| MON. | FRI. |       | BEFORE |       |
|------|------|-------|--------|-------|
| TUE. | SAT. | NOON  | AFTER  |       |
| WED  | SUN. | TODAY | BETWEEN |      |
| THUR.|      | TOMORROW | NOT BETWEEN | RESET |

FIG. 8. PRODUCT GROUP SELECTION

INVENTOR
Thomas Raymond Thompson
BY
Cushman, Darby & Cushman
ATTORNEYS

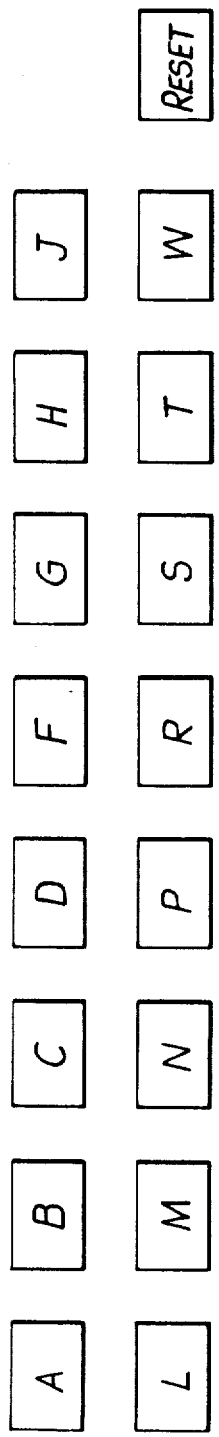

|  | CASES |
|---|---|
| TONS | GALLS. |
| Pds. | Qts. |
| Ozs. | Pts. | RESET |

FIG. 12.

| CORRECT | CANCEL | DAY START |
|---|---|---|
| START | END | ALPHA | RESET |

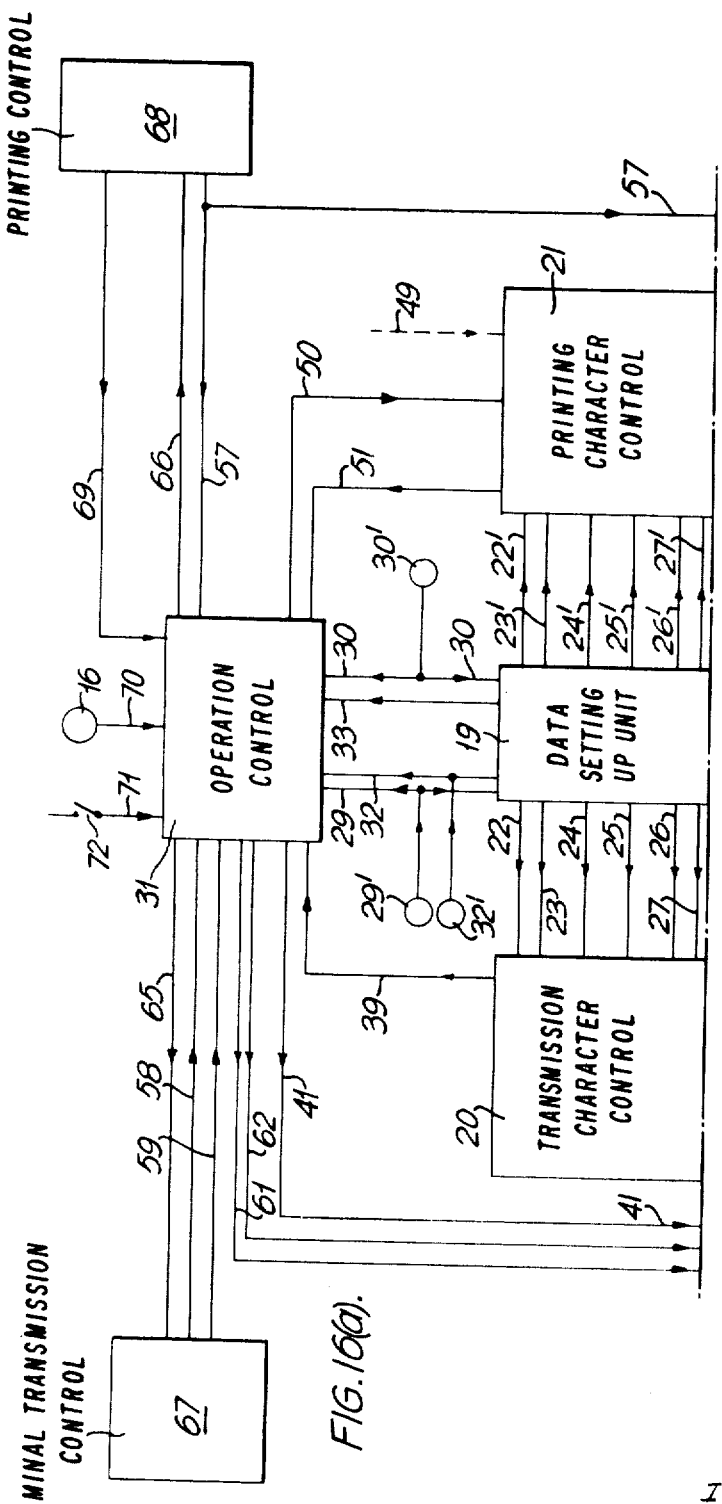

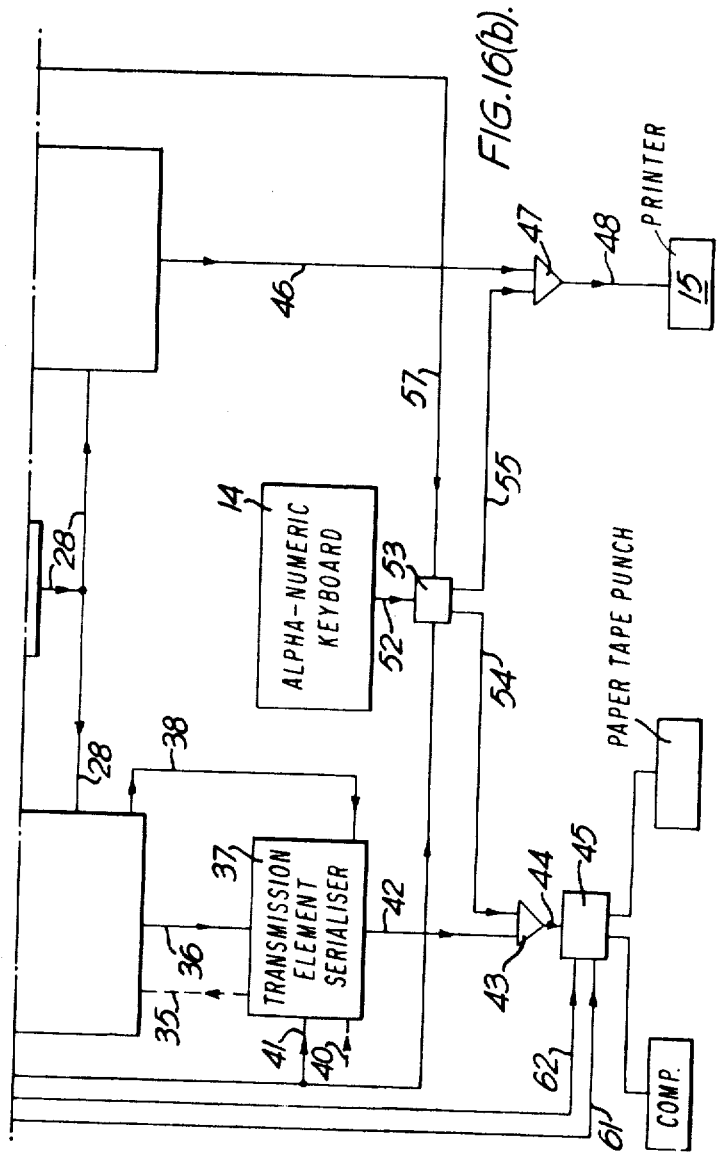

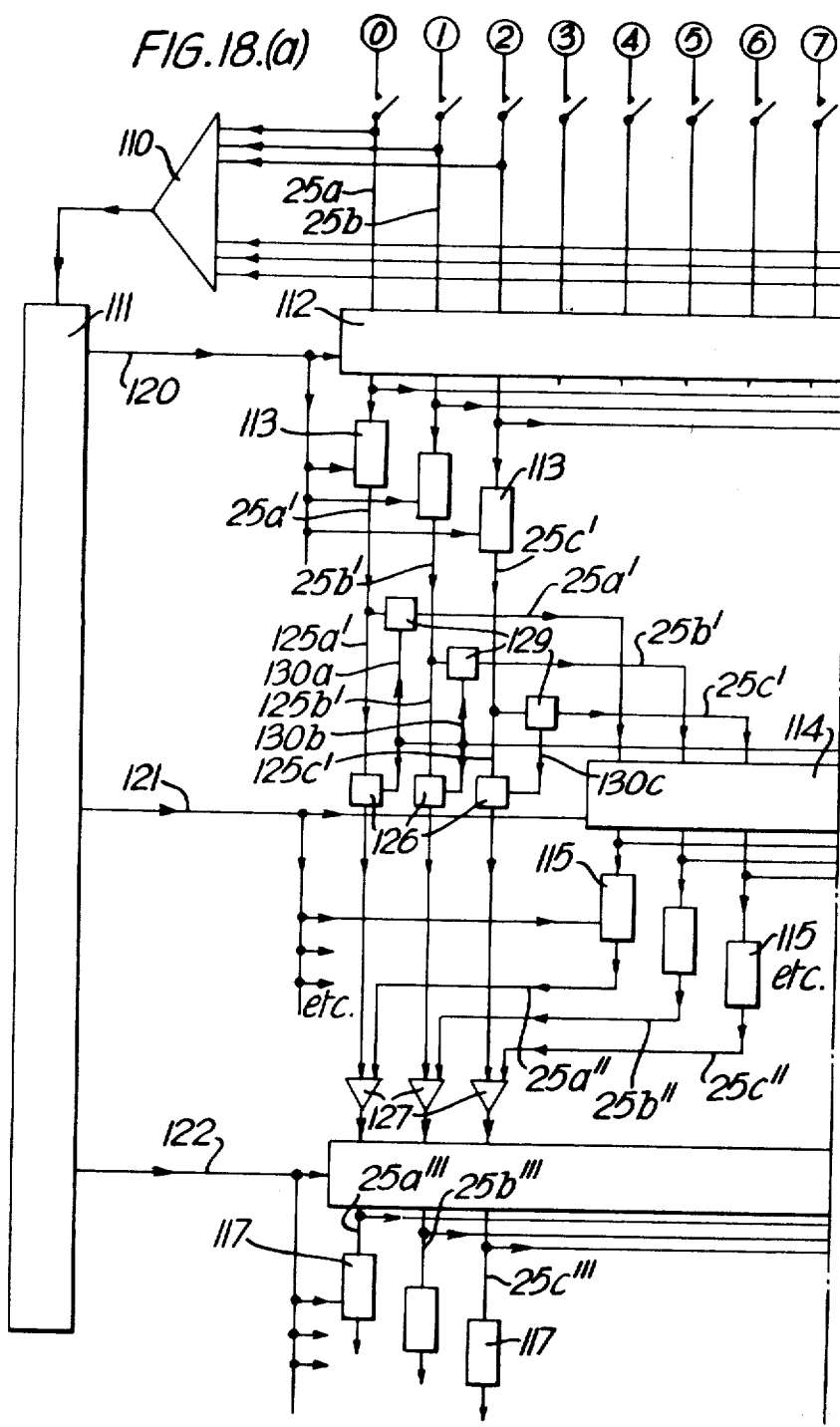

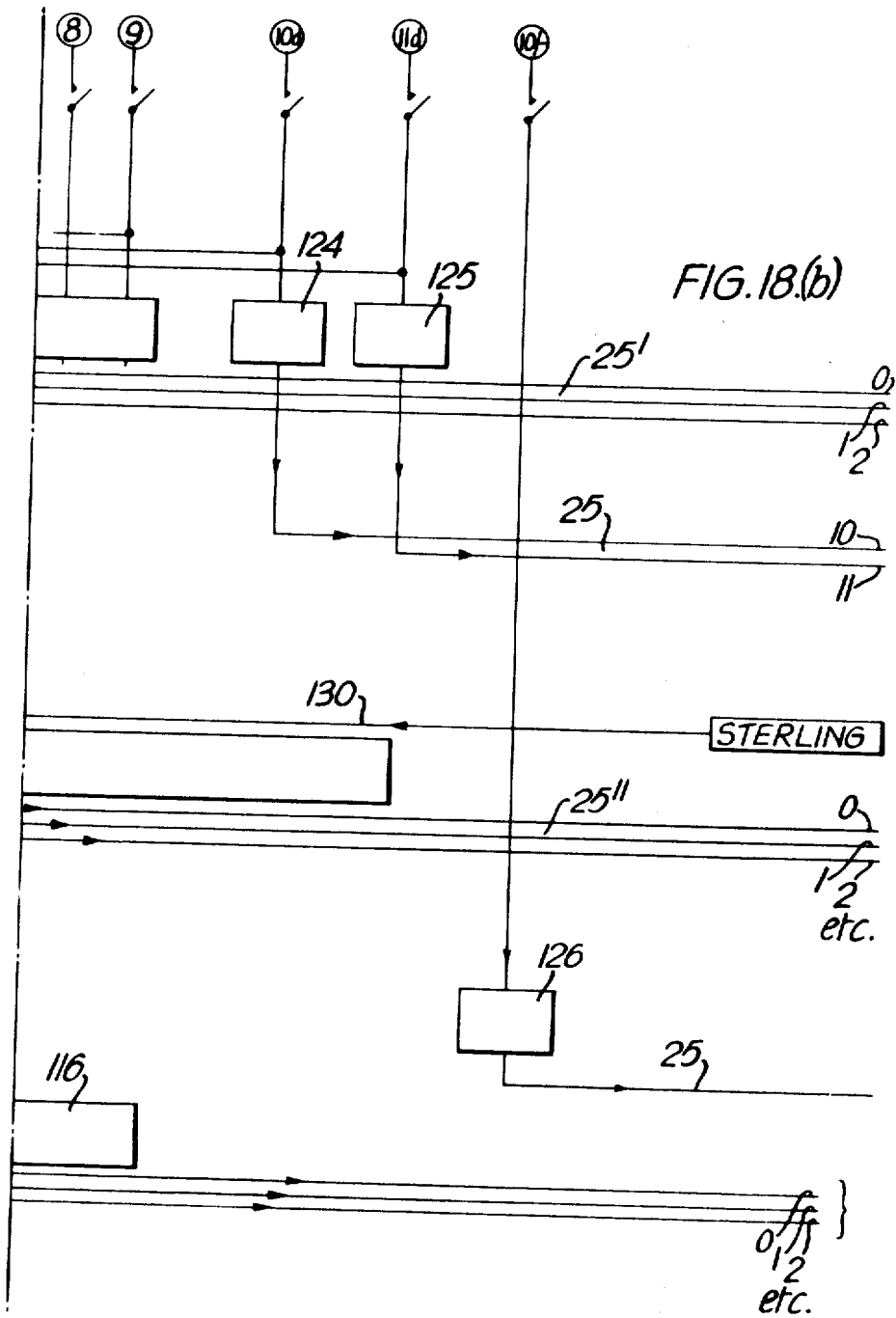

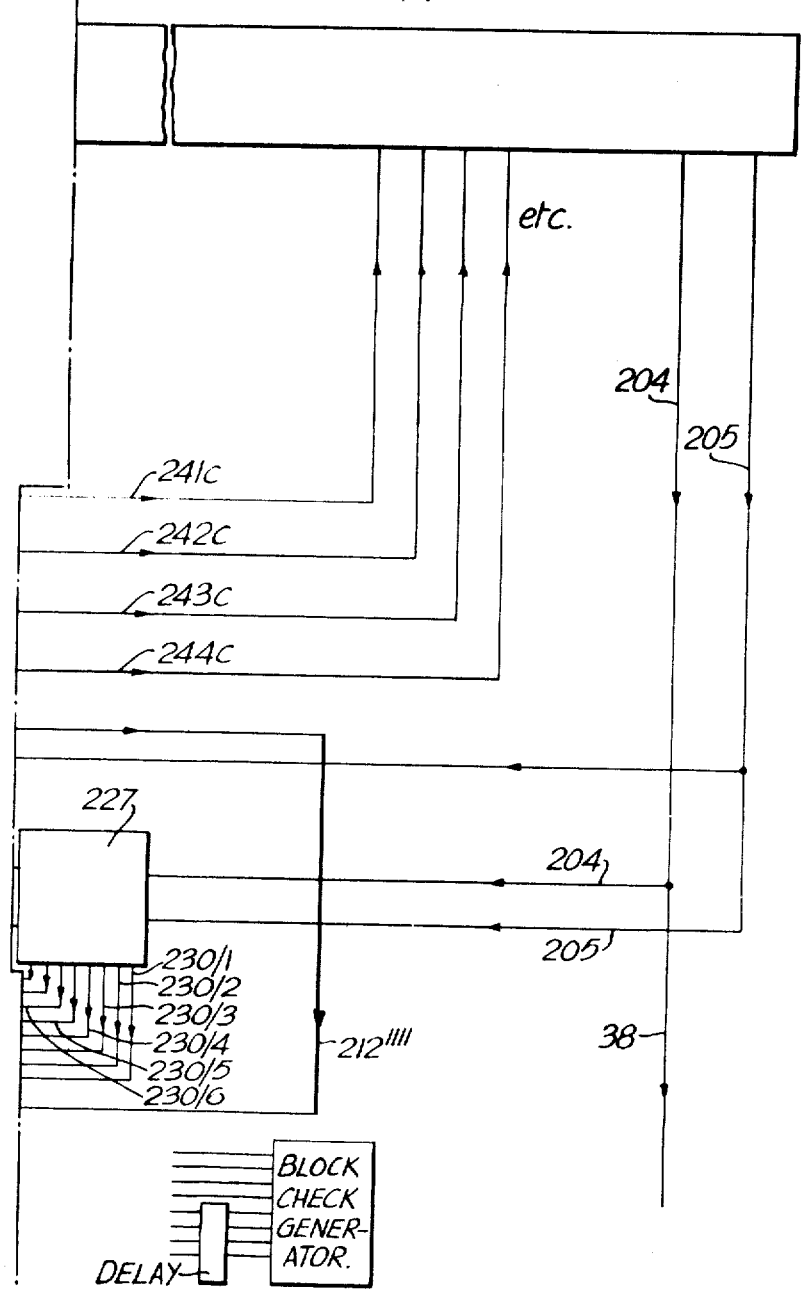

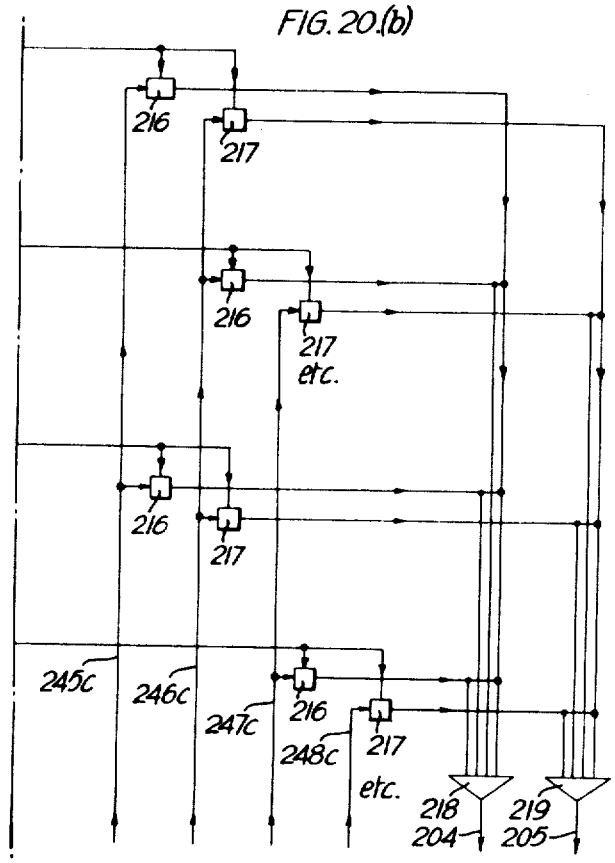

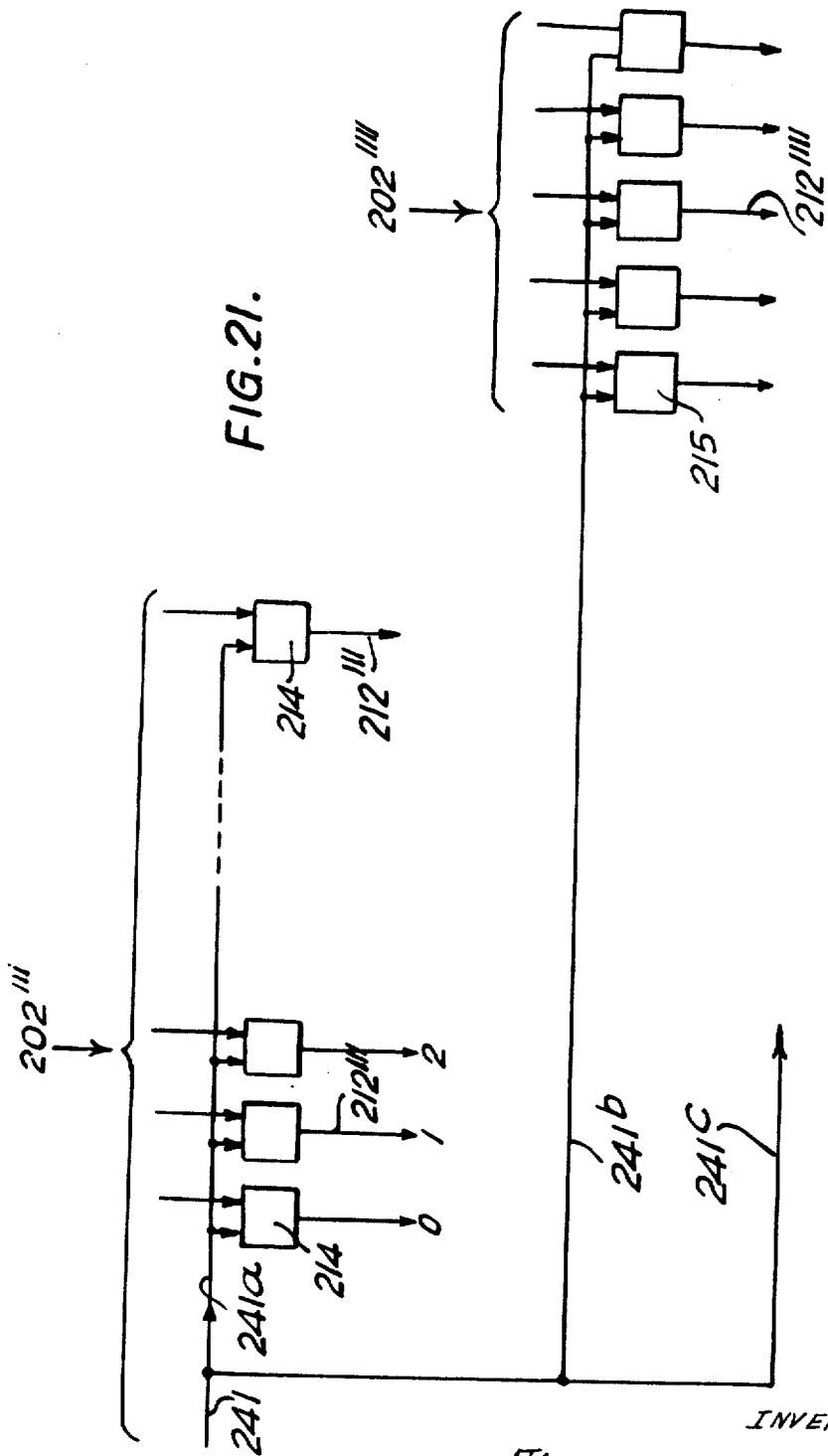

Nov. 17, 1970   T. R. THOMPSON   3,541,519
DATA CAPTURE

Filed Nov. 7, 1967   28 Sheets-Sheet 26

INVENTOR
Thomas Raymond Thompson
BY
Cushman, Darby & Cushman
ATTORNEYS

3,541,519
DATA CAPTURE
Thomas Raymond Thompson, Trevonen, The Clump,
Rickmansworth, England
Filed Nov. 7, 1967, Ser. No. 681,216
Claims priority, application Great Britain, Nov. 7, 1966,
49,733/66
Int. Cl. G06f 9/18
U.S. Cl. 340—172.5                                  9 Claims

ABSTRACT OF THE DISCLOSURE

Data collection apparatus comprises a plurality of banks of signal lines, means for applying voltage signals to a selection of the signal lines of each bank whereby a variety of different characters may be formed on each bank representing different data items, and reading and coding means for reading the characters so formed and transmitting coded signals representative thereof and of each of the banks from which the signals originate. Preferably a plurality of characters are grouped together, before or after coding, and transmitted after coding as a single block of information.

---

This invention relates to data collection apparatus and more particularly to apparatus for collecting data relating to selected items of standardized information.

In a wide variety of industrial, commercial and other situations, it is often desired to make up a selection of standard items, or to associate one or more standard items of a particular category with one or more standard items of one or more other categories. A simple example of the former is a list of standard goods which are to be assembled for some particular purpose, and an example of the latter is the issue to one of the registered readers of a library of a particular book. In such instances, and still more so in more complicated situations, for example where different selections of standard goods are to be sent to a wide variety of destinations on different occasions there is at present no simple method of compiling the information that does not involve a substantial amount of transcription which may well take a long time to complete, and which introduces considerable likelihood of clerical error.

It is an object of the present invention to provide apparatus which makes it possible quickly and accurately to register the precise identification of any one item of any given category, for use in carrying out of routine operations such as those described above.

In its simplest form, the apparatus may just collate two such items; in more complicated systems, it may be possible to group together a large number of items selected from a wide variety of different classifications, and provision may be made for including alpha-numeric information with such data as is appropriate for the particular group of items being considered.

Figure 1:
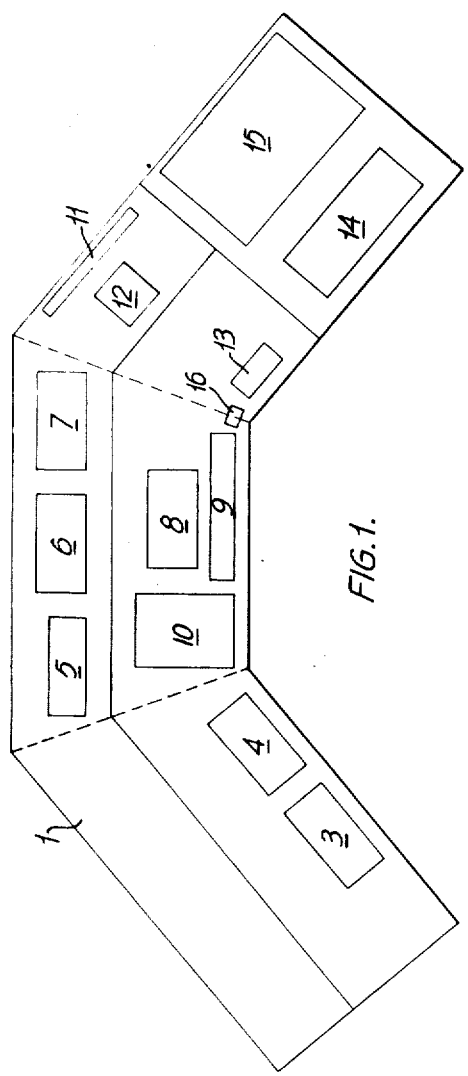
Figure 2:
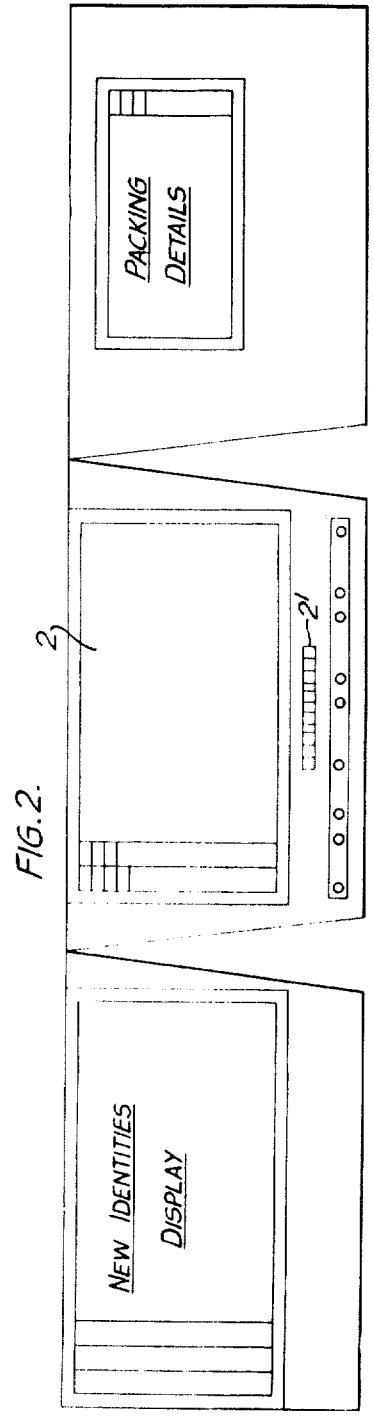
Figure 15:
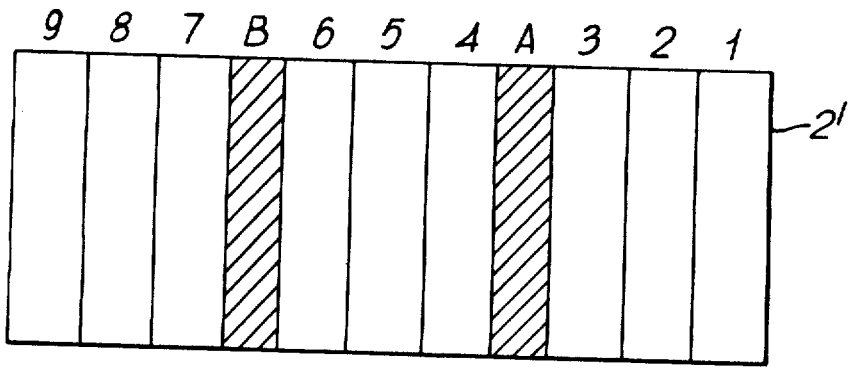
Figure 23:
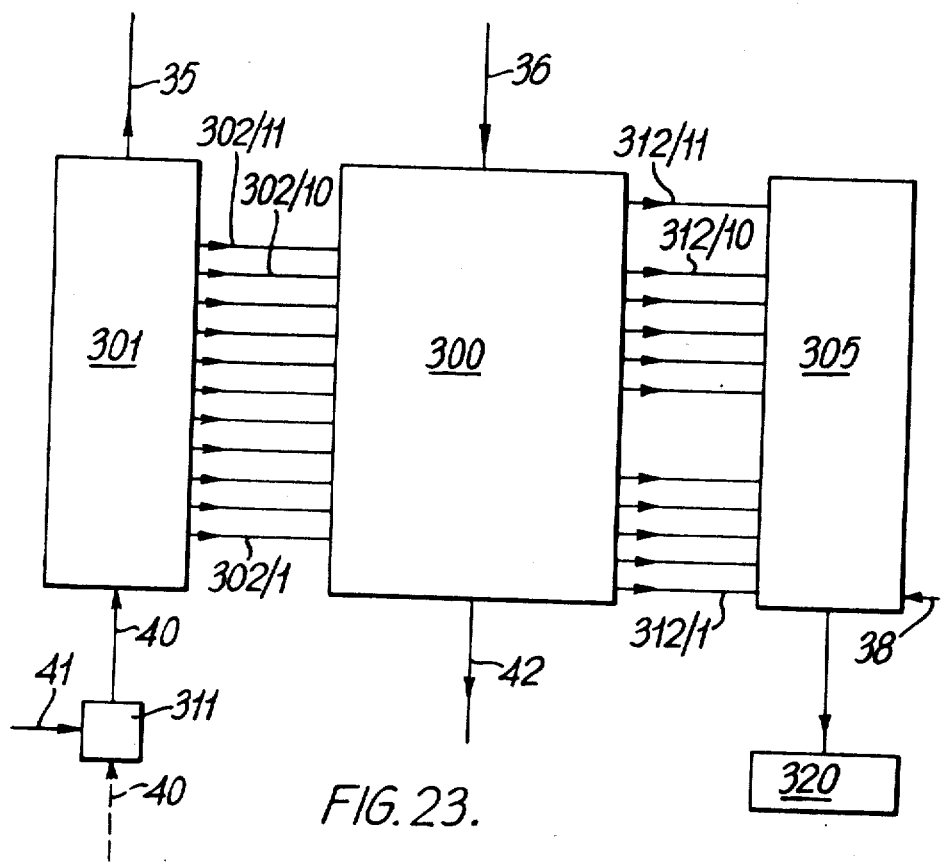
Figure 17:
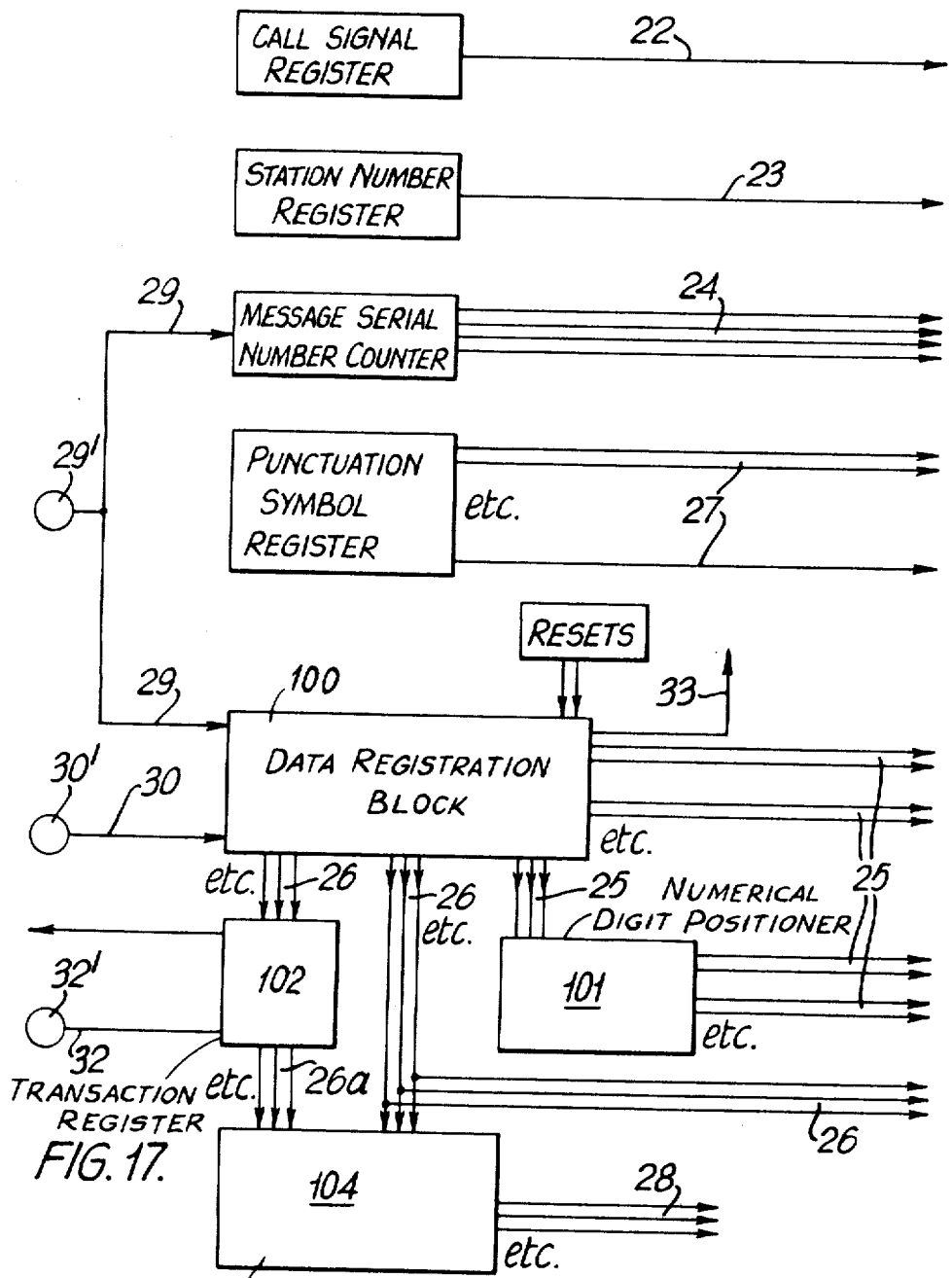
Figure 19:
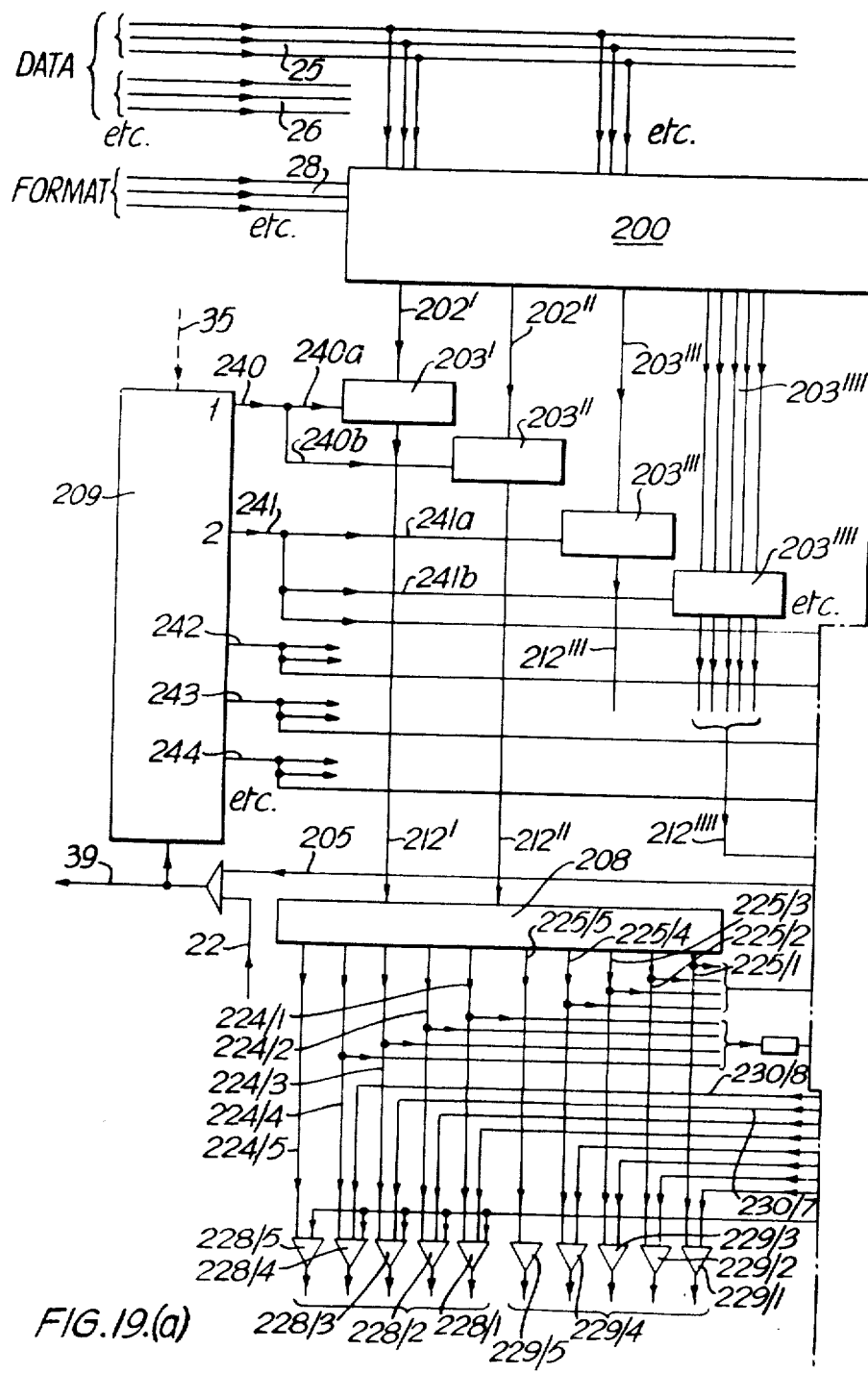
Figure 20:
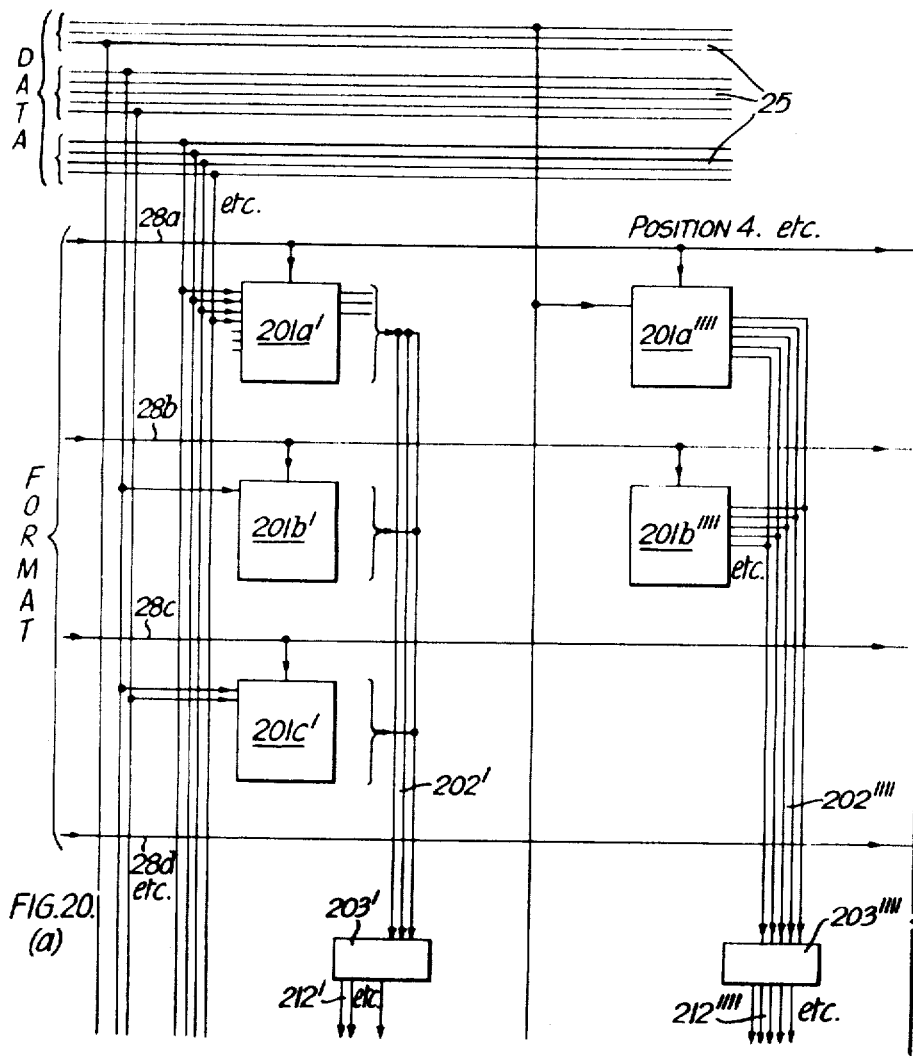
Figure 22:
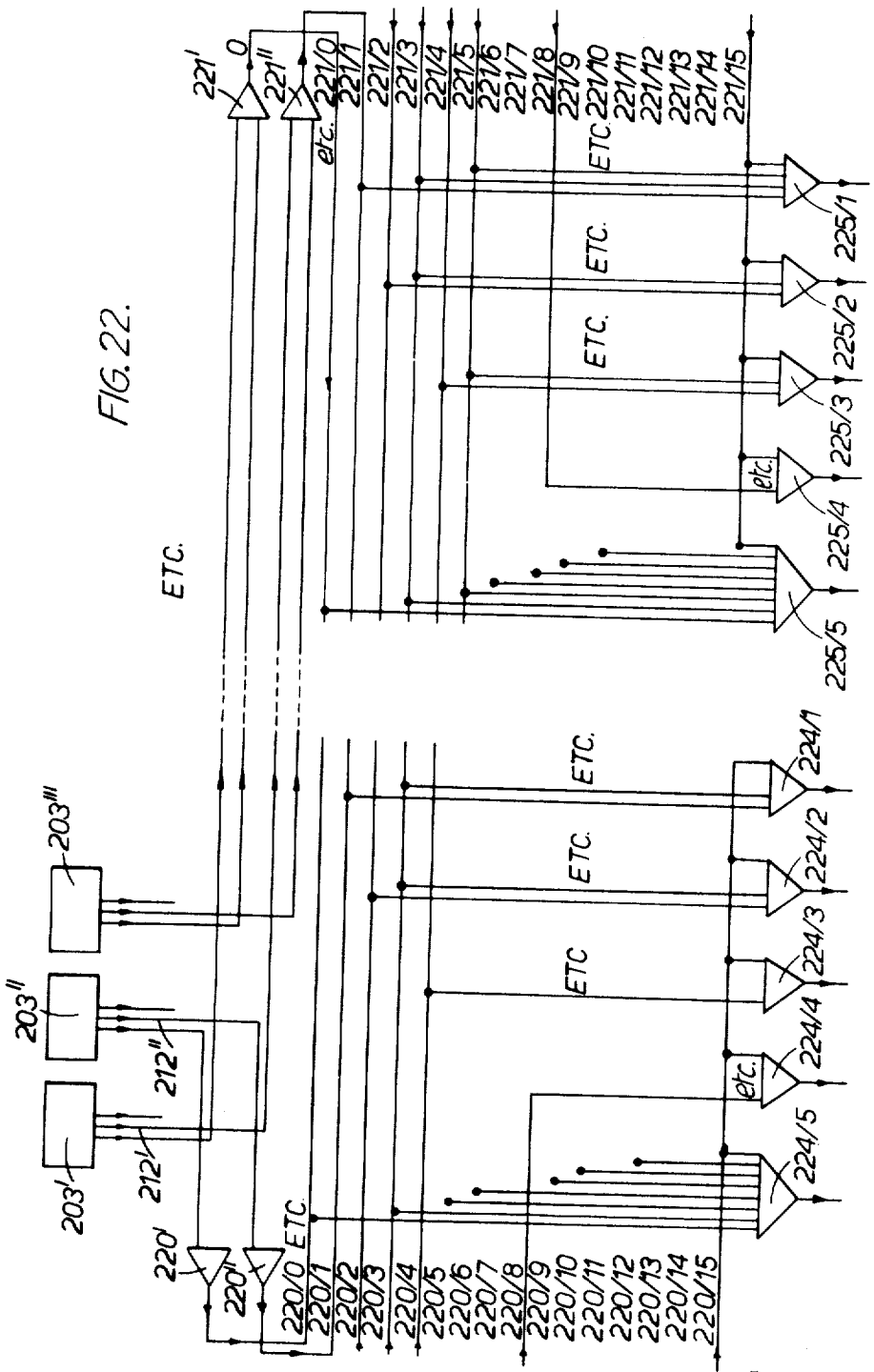
Figure 24:
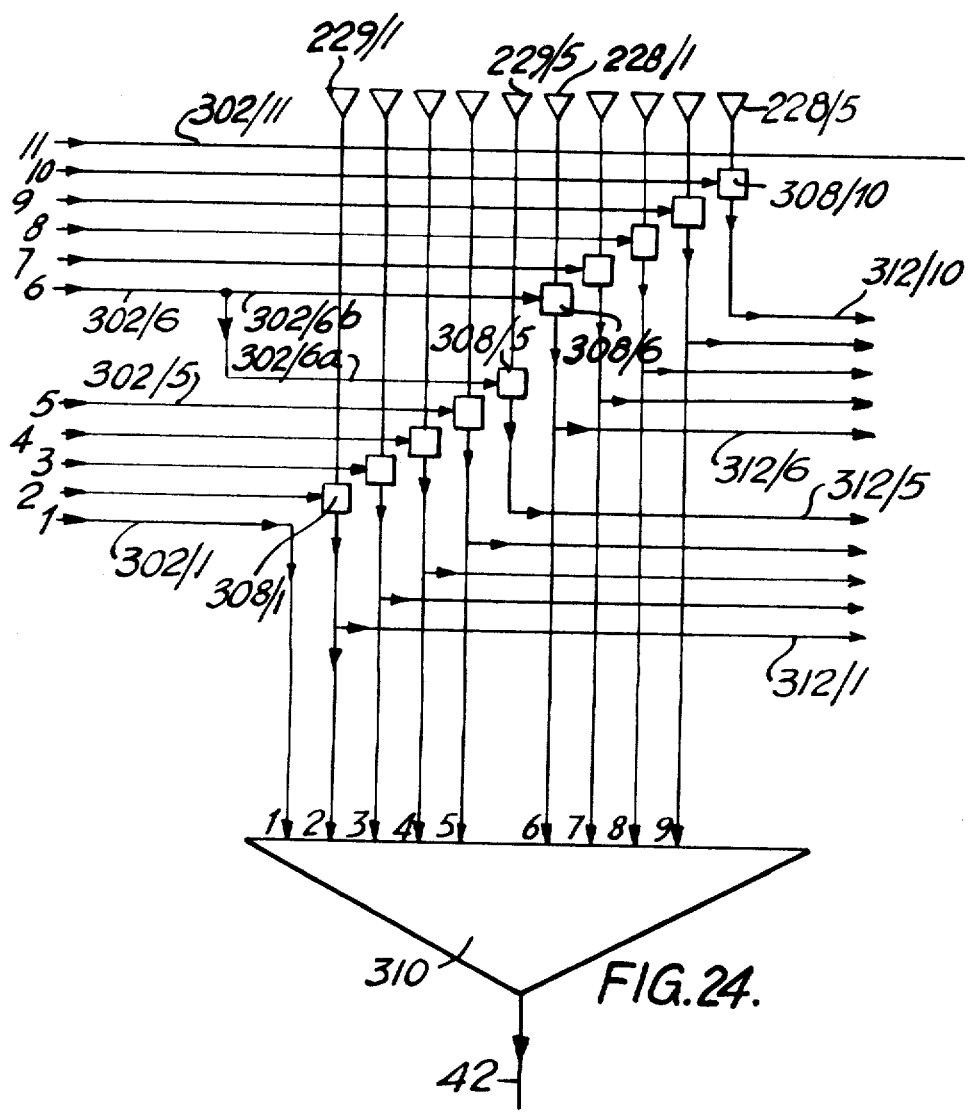
Figure 25:
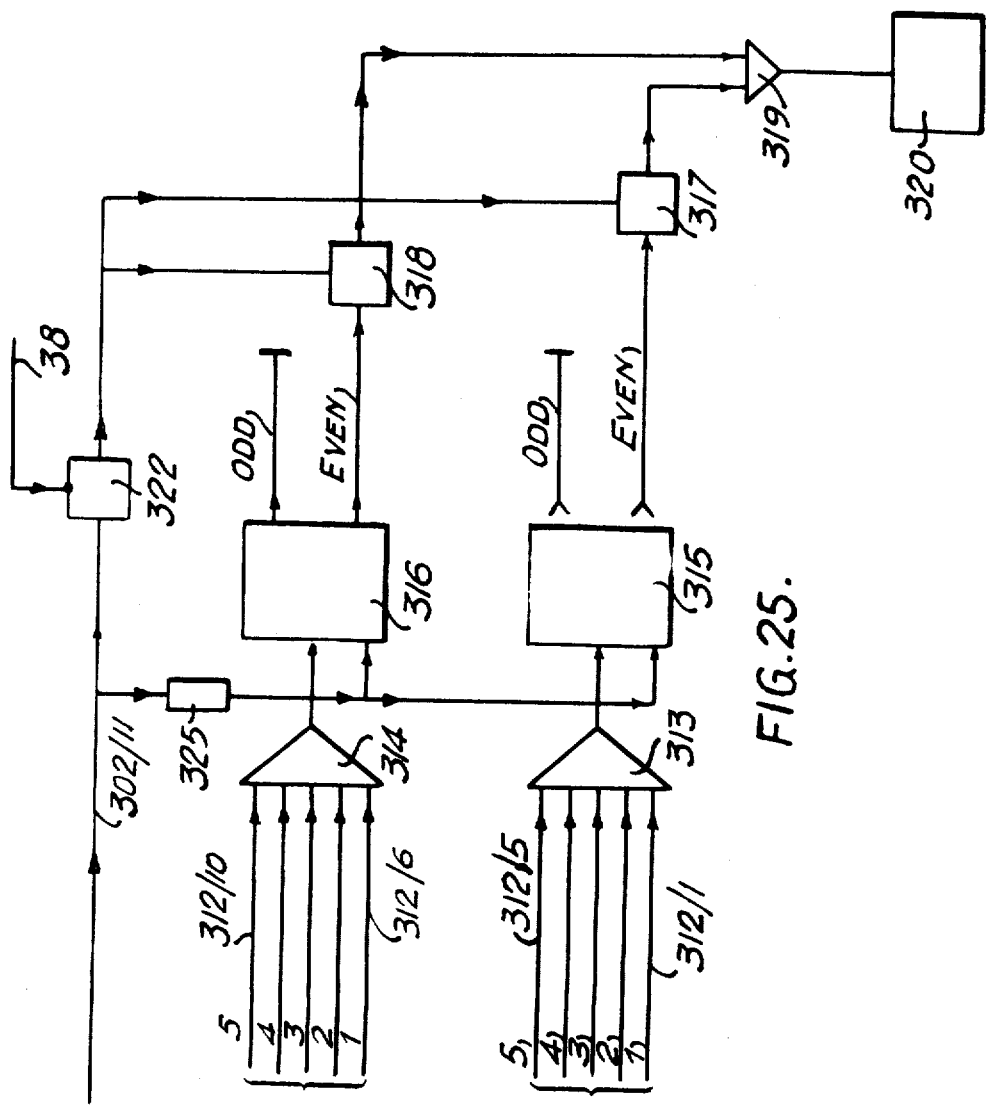
Figure 26:
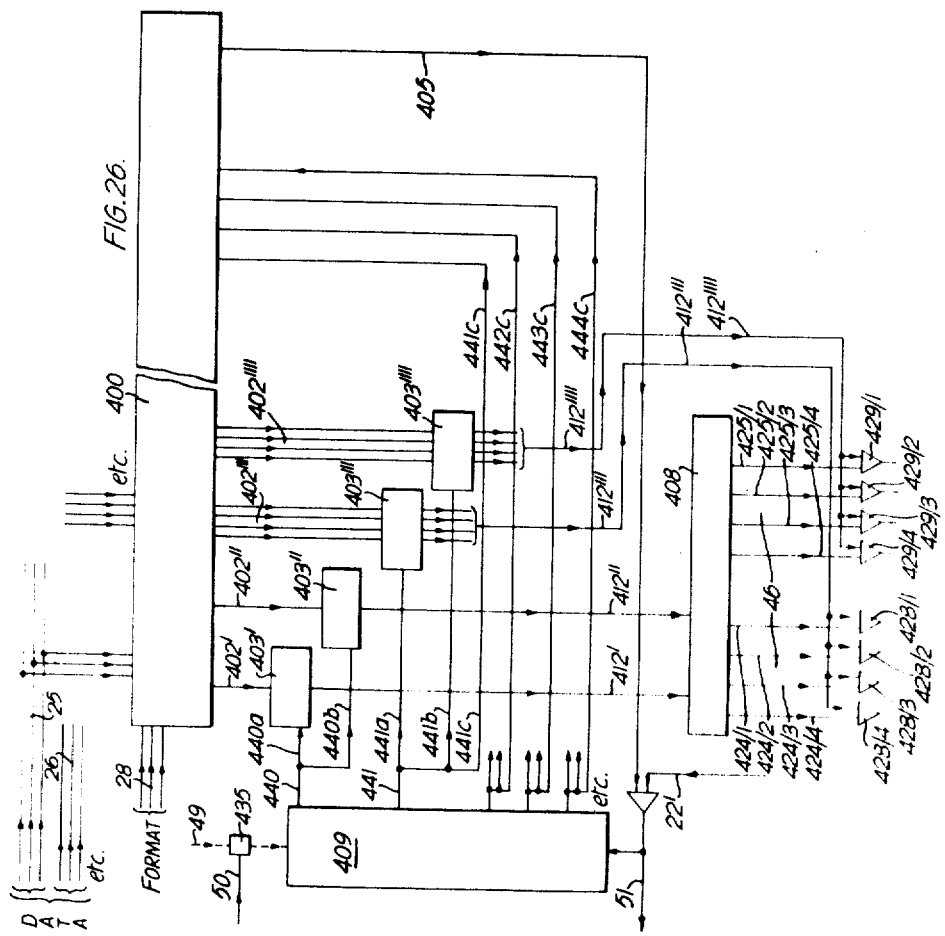
Figure 27:
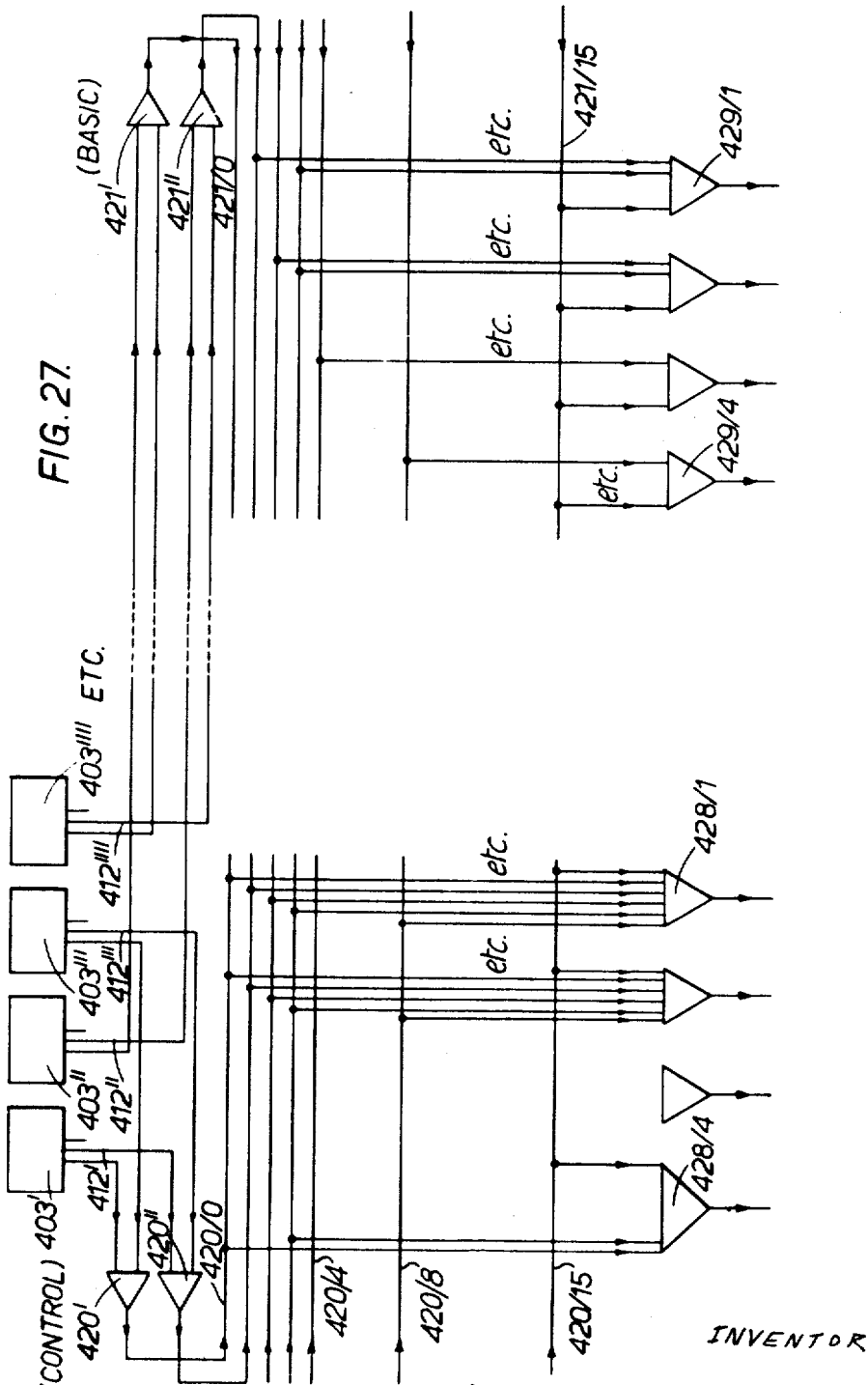
Figure 28:
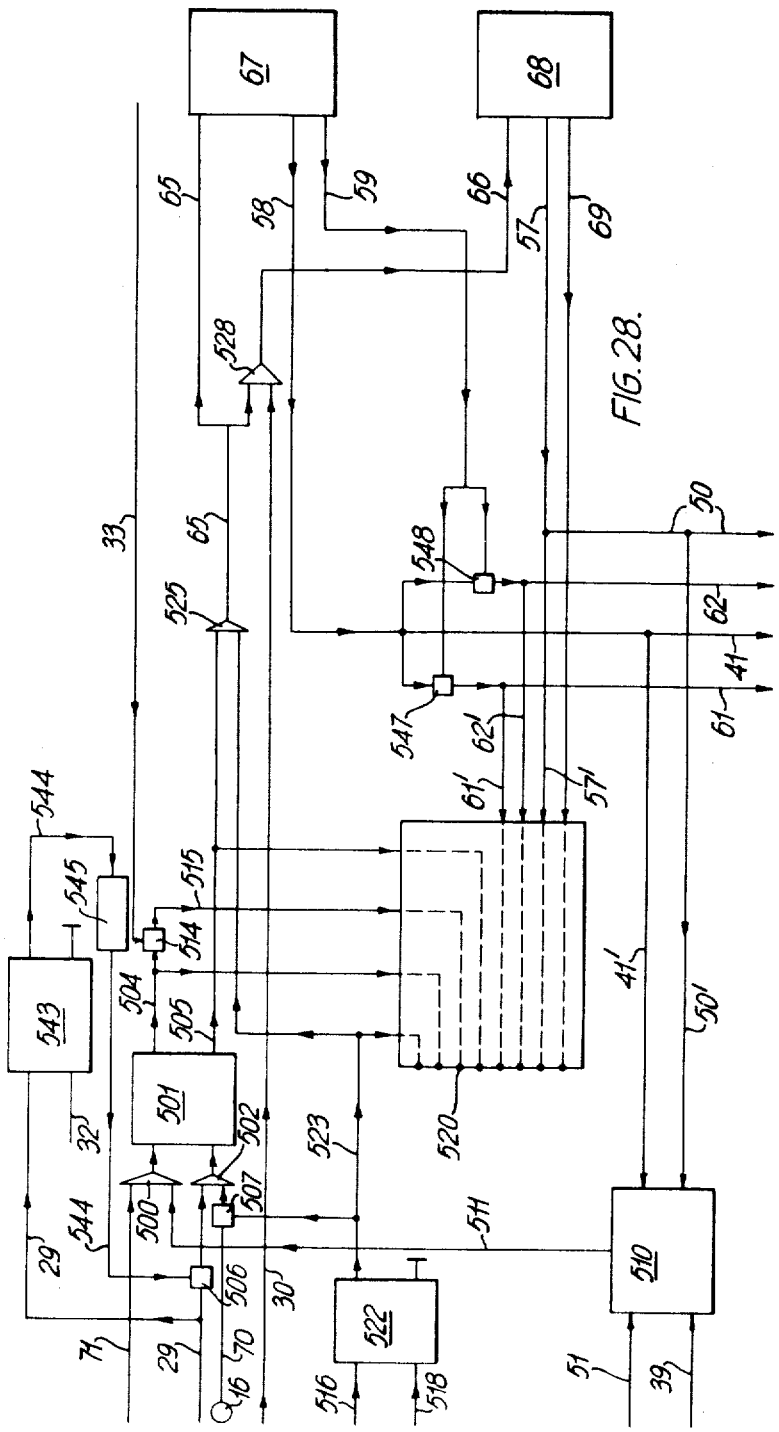
Figure 29:
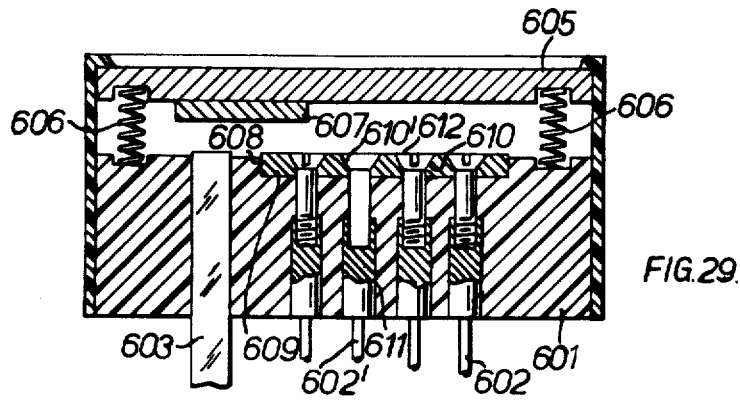
Figure 30:
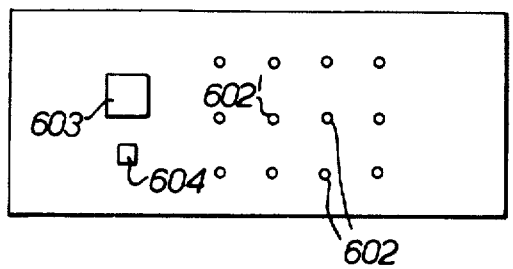
Figure 31:
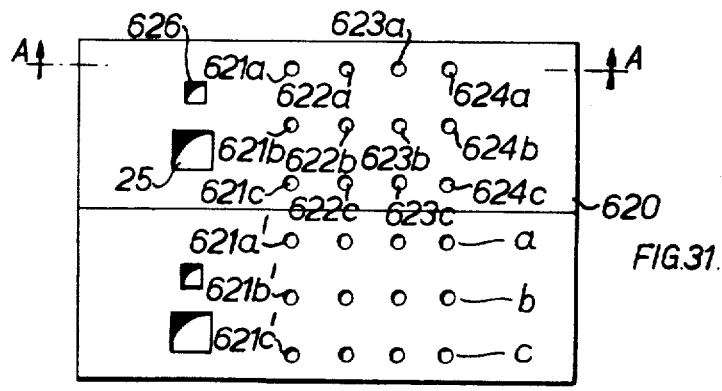
Figure 32:
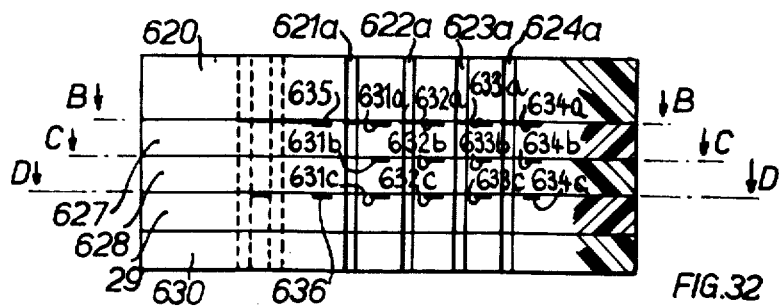
Figure 33:
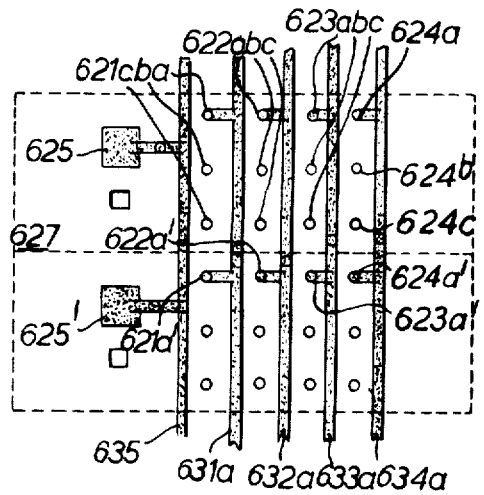
Figure 34:
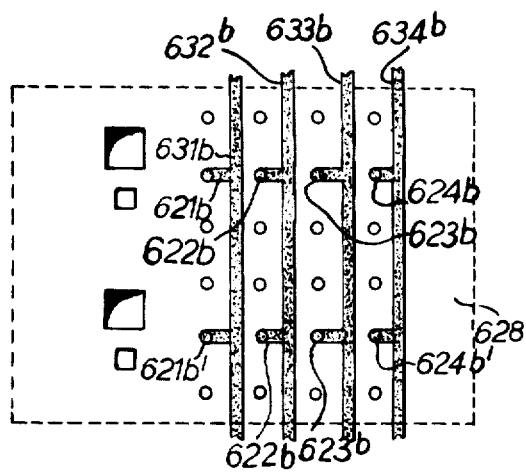
Figure 35:
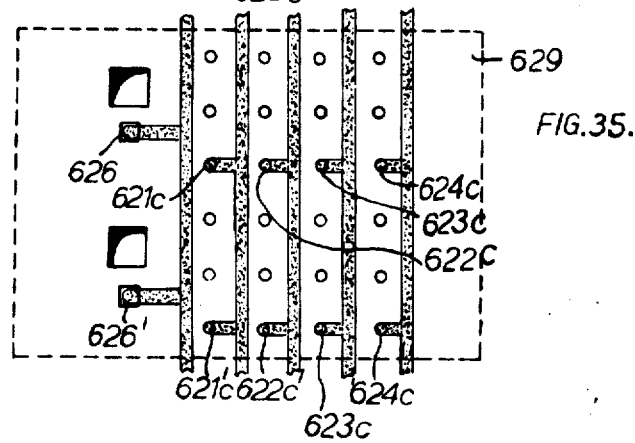
Figure 36:
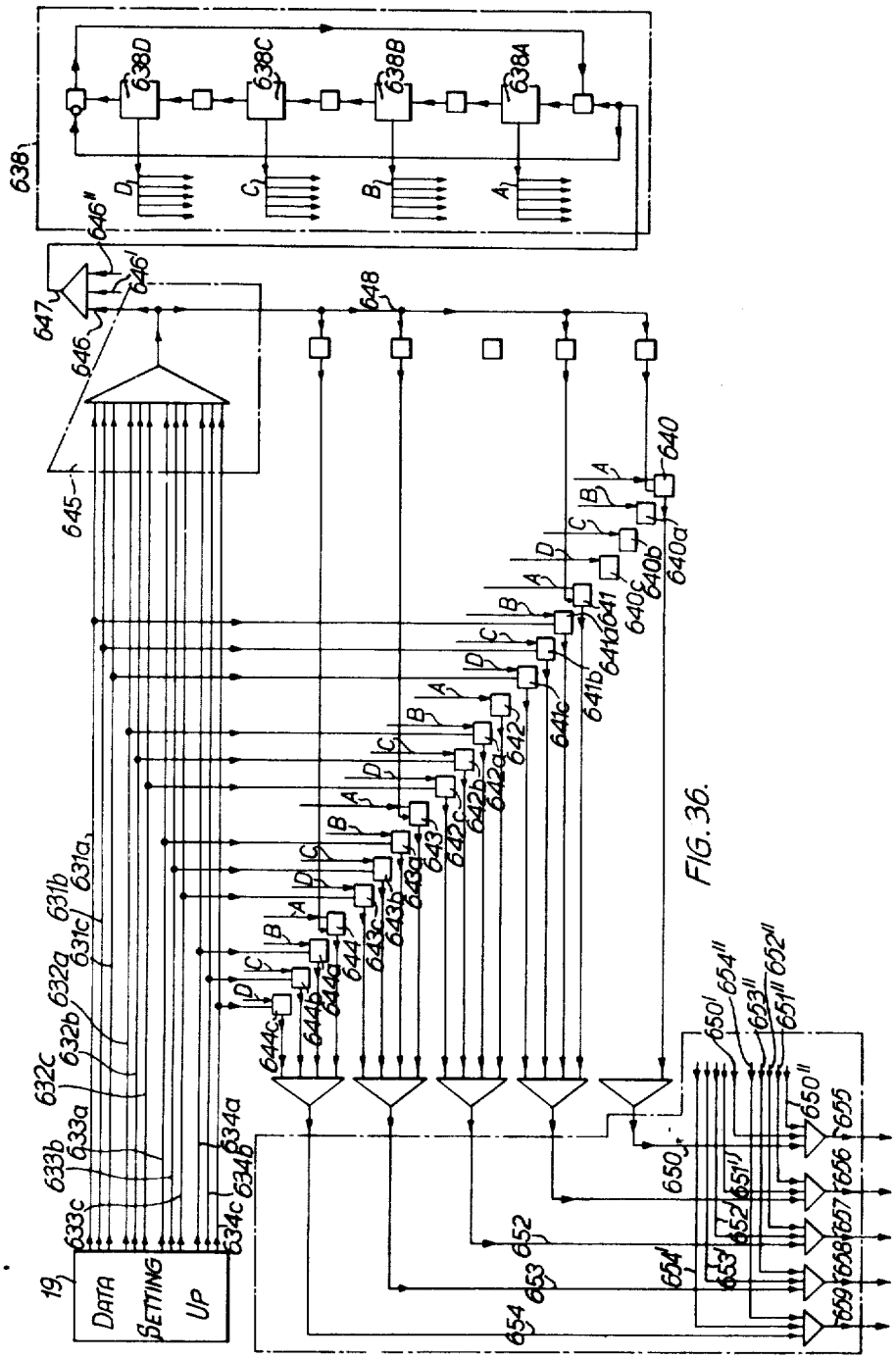

Embodiments of the invention are illustrated in the accompanying drawings in which:

FIG. 1 is a diagram of the layout of keyboards in a console forming part of the apparatus;
FIG. 2 is a diagram of the layout of display panels for use with the console of FIG. 1;
FIGS. 3 to 13 are diagrams showing suitable layouts for individual keyboards of the console of FIG. 1;
FIGS. 14 and 15 are diagrams of two of the display panels of FIG. 2;
FIGS. 16a and 16b are block diagrams showing generally the arrangement of the main parts of the apparatus, in particular a Data Setting Up unit, a Transmission Character Control, a Transmission Element Serialiser, a Printing Character Control and an Operation Control;
FIG. 17 is a diagram showing in more detail the main parts of the Data Setting Up unit of FIG. 16;
FIGS. 18a and 18b are a diagram showing the arrangement of a numerical digit positioner as may be used in the Data Setting Up unit of FIG. 17;
FIGS. 19a and 19b are a block diagram of the Transmission Character Control of FIG. 16, including a Transmission Character Selector, a Character Releaser and a Character Encoder;
FIGS. 20a and 20b are a block diagram of the Transmission Character Selector of FIG. 19;
FIG. 21 is a block diagram of the Character Releaser of FIG. 19;
FIG. 22 is a diagram of the Character Encoder of FIG. 19;
FIG. 23 is a block diagram of the Transmission Element Serialiser of FIG. 16, including a Signal Group Generator and a Parity Checker;
FIG. 24 is a diagram of the Signal Group Generator of FIG. 23;
FIG. 25 is a diagram of the Parity Checker of FIG. 23;
FIG. 26 is a block diagram of the Printing Character Control of FIG. 16, including a Printing Character Encoder;
FIG. 27 is a diagram of the Printing Character Encoder of FIG. 26;
FIG. 28 is a block diagram of the Operation Control of FIG. 16;
FIG. 29 is a vertical cross-sectional view of a coding switch that may be used in the keyboard of the console of FIG. 1;
FIG. 30 is a plan view of the underside of the switch of FIG. 29;
FIG. 31 is a plan view of part of a keyboard suitable for receiving the coding switch of FIGS. 29 and 30;
FIG. 32 is a cross-sectional view of the portion of the keyboard of FIG. 31 taken along the line A—A;
FIGS. 33, 34 and 35 are cross-sectional views of the parts of the keyboard off FIG. 32 taken along the lines B—B, C—C and D—D respectively; and
FIG. 36 is a block diagram of reading and coding circuitry that may be used in association with the switch and keyboard of FIGS. 29 to 35.

In FIGS. 1 and 2, there are shown respectively the top of a console 1 and an associated array of display screens 2. The top of the console contains eleven keyboards 3–13 representing various different groups of items enabling a variety of different selections of data to be made. The top is also provided with a keyboard 14 for use in setting up alpha numeric information, a printer 15, such as a teleprinter, and a "Block Complete" button 16.

It will become apparent from the following description, that the nature of the information collected by the apparatus of the invention may be of any type, and the significance of the keys of the various keyboards accordingly will depend on the type of data of interest. Since a common use for the apparatus will be in the offices of, for example, a selling organisation that wishes to collate information regarding, primarily, customers, goods supplied by or ordered from them and goods supplied to and ordered by them from various sources, the particular keyboard layouts described are those that would be suitable in such an application. However it will be clear that the invention is not in any way limited in this respect.

The purpose of data capture apparatus of the type disclosed is to enable particulars of such transactions of goods to be passed directly to a computer for processing without transcription and the inevitable occasional consequent errors. In large scale operations, several sets of data collection apparatus may be connected to the one computer, either directly or else indirectly through one of several terminal stations each of which contains two or more sets of data collection apparatus.

For reasons relating to the maximum number of different code signals available in a four element code, the maximum number of buttons in one keyboard is normally sixteen. Accordingly the items of information to which the computer may respond are assembled, in normal practice, in groups of not more than sixteen. To accommodate substantially larger groups, for example lists of customers, information may be set out in a convenient spatial arrangement, for example, a series of columns each of sixteen rows. Such an arrangement is shown in FIG. 14, described more fully below, in which one of the screens 2 is illustrated having fifteen columns each of sixteen rows. The columns and rows are individually lettered as shown from A to T or W respectively, and a particular item is selected from the screen by operating first a key representing the appropriate column and then a key representing the appropriate row.

The keyboard 3 illustrated in FIG. 3 relates to various type of transaction that may take place. Thus different buttons are available to indicate whether the data relate to an order or a receipt of cash, the completed delivery of goods or to stocks held, for example. It is desirable that any button when pressed should become illuminated, so that the operator can rapidly check that no error has been made. In the event of an error, a reset button as shown is provided, which cancels the data set up and permits a fresh button to be operated. Similar facilities of illumination of the button and a reset button are provided for the other keyboards. Accordingly no further reference to these facilities elsewhere need be made and this should be borne in mind when considering the description relating to the other keyboards.

The keyboard 4 illustrated in FIG. 4 shows a bank of sixteen buttons each designated with one or more letters. Each of these buttons, in the embodiment illustrated, represents a different set of customers whose initial letters are that or those of the button concerned. In one very desirable arrangement, the pressing of one of the customer buttons causes one of the screens 2 to have automatically projected on it a list of customers so arranged or having indicator symbols, e.g. letters, allocated to each that the operator can immediately read from the display which further buttons should be operated to select any one customer. Very suitably the customers are set out in an arrangement of rows and columns of the type shown in FIG. 14 with the name of a different customer in each position. As previously mentioned, the selection of a particular customer is then made by operating firstly a key representing the appropriate column and secondly a key representing the appropriate row of the group illustrated on the screen 2. Sixteen keys for this purpose, lettered from A to W, are set out in the keyboard 9 illustrated in FIG. 9.

A convenient method of arranging for the projection of the customers' details in each group is to have a separate transparent card for each customer on which is printed the relevant details. These are then arranged in groups in alphabetical order for use in the displays. Whenever details of a new customer are received, a further transparent card is prepared, and this is included in the panel of spare positions until such time as a rearrangement of the group displays into alphabetical order is effected.

The keyboard 5, illustrated in FIG. 5 relates to the months of the year, and its operation requires no explanation. The keyboards 6 and 7, illustrated in FIGS. 6 and 7 relate respectively to special features and miscellaneous details appropriate to the use to which the apparatus is to be put. Thus, the special features of keyboard 6 may include keys indicating that the immediately following data relate respectively to the supplier's and the customer's references and to, for example, the date, the time for delivery of goods, and the delivery point or access details. As will be apparent, the buttons of keyboard 6 are not in themselves sufficient to provide all the information, and after pressing any one of the buttons further information is set up particularizing the references or date or time, etc., relevant to the transaction concerned. Such particular information may be provided by operating one of the buttons of the keyboard 7 or it may be provided by setting up alpha numeric information on a conventional keyboard such as that of a teleprinter.

The keyboard 8, the layout of which is illustrated in FIG. 8, is used in a manner comparable to that of the customer keyboard 4. Thus any one button causes a group of products to be projected on to one of the screens 2, from which a particular item is selected by operating the appropriate keys representing the individual column and row of that item.

The column row selection keyboard 9, illustrated in FIG. 9, has already been mentioned, and requires no further description. It should be noted however that the operator must set up information relating to the columns and rows in the correct order each time. In the embodiment described the order of setting up information is generally irrelevant as special format means described below automatically standardize the order for any type of transaction, but in this respect the operator must follow a standard procedure for the data to be correctly interpreted by the central computer.

Figure 10:
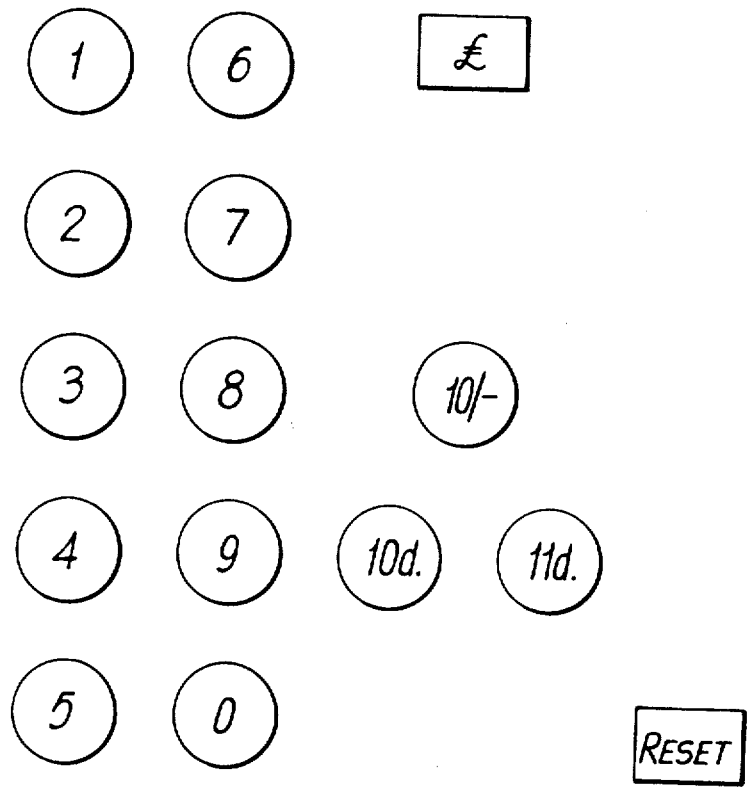

Keyboard 10, illustrated in FIG. 10, provides means for setting up numerical information. This may refer, for example, either to the numbers of particular items of goods or to cash transactions. For the latter purpose, particular buttons are provided for referring to pounds (£), ten shillings (10/-), ten pence (10d) and eleven pence (11d).

Keyboard 11, illustrated in FIG. 11, consists of ten buttons containing the integers 1 to 9 and 0, and is used for providing information relating to packing details. A permanent display is arranged on one of the screens 2 suitably having ten columns each of ten rows, each position relating to a different type of packing, e.g., pint cans. As when selecting individual customers or products, the packing of a particular transaction is chosen by pressing the appropriate button for the column concerned and then the appropriate button for the row.

Keyboard 12, illustrated in FIG. 12, sets out units that may be applied to items of goods, and is used primarily in cases where the packing details keyboard 11 is inappropriate or does not contain the particular details required.

The keyboard 13, illustrated in FIG. 13, provides a control over the information set up and has six buttons, apart from the usual reset button. A "Day Start" button is pressed at the beginning of each day. This clears any spurious data from the apparatus and may be used to print the relevant date at the top of the reference copy of the printer 15 after setting up the correct date using the keyboards 5 and 10. A "Start" button is pressed for the start of each message. One effect of this, as will be explained in more detail below, is to determine whether a line is available for transmission of information to the central computer, or whether the information that is to be set up should be transferred to a recording medium, such as a punched paper tape. The "Start" button also sets up a message serial number for each message, this number being automatically stepped up by one on each operation of this button or of the "End" button which is pressed when a message is completed. The button marked "Alpha" is pressed whenever ordinary alpha numeric information is to be set up. This is used wherever the standardised information that can be set up by using the keyboard buttons requires amplification in a manner that is not provided for by the console keyboards.

The keyboard 13 also contains "Correct" and "Cancel" buttons. These signify to the computer that information already received by it is incorrect in some respect. The former of these is used when some information is found after transmission to require alteration or deletion, in which case the reset button cannot be used. If it is desired to amend an item in a transmitter block before the message concerned has been completed, then operating the "Correct" button, and repeating the relevant information correctly effectively countermands the previous incorrect information. If the message concerned has already been completed then the serial number of that message must also be set up immediately after operating the "Correct" button, so that the computer is informed of which message requires amendment. The remaining operations are then carried out as before. The "Cancel" button acts simply to countermand all of any one message. This may be a current incomplete message or a completed one, in which latter case the message serial number must also be set up to identify it to the computer.

It is envisaged that a number of positions in each of the groups of customers be left blank so that additions may be made as required. Conveniently, therefore, there are fifteen columns each of sixteen rows in any one group, and a sixteenth column is set out in a separate list which contains the names of additional new customers. This most suitably takes the form of a fixed display of sixteen columns, as in the left-hand screen 2 (FIG. 2), each column representing the final, sixteenth, column of one of the groups. New identities may be inserted into the positions of this fixed display using e.g. appropriately prepared cards, and from time to time the names in the groups would be rearranged so as to include new customers from the sixteenth column in the main body of the group. Selection of an identity from the fixed display is made by first pressing the appropriate customer group button. The name concerned not appearing in the particular group projected on the central screen 2, the operator finds it in the fixed display, then presses the "W" button to indicate the sixteenth column, and finally presses the button for the appropriate row in which the desired identity occurs.

To provide a rapid visual check on the column and rows selections that are made when identifying individual customers or products it is desirable to provide for selective illumination of the column and row corresponding to the particular buttons operated. It will then be immediately apparent which identity has in fact been set up. This facility can readily be extended to provide a visual check in a corresponding manner also on items selected from the new customers display.

The embodiment described contains provision for sixteen groups, each containing up to 256 customers. The possible total of 4,096 customers is likely to be sufficient in most circumstances, but should provision for a greater number be required, a second series of up to sixteen groups can be provided simply by having in the console a pair of buttons one representing the first series, and the second the second series of groups. One of these two buttons will then be pressed immediately prior to operating the customer button of the keyboard 4.

A numerals display screen 2' is provided for displaying the numerals selected from the numerals keyboard 10. As illustrated in FIG. 15 the display contains nine columns for displaying digits, these being broken into three groups of three columns by spacing columns A and B. These latter provide a form of punctuation to facilitate checking by the operator that the correct number has been recorded. To record numbers, the button corresponding to the most significant digit is pressed first, and so on for all the digits taking them in decreasing order of significance. On pressing the first button, the relevant digit appears in column 1, and on pressing the second button the digit present in column 1 is stepped to column 2, while the second digit appears in column 1. This process is repeated for each of the digits of the number concerned, the recorded digits all being stepped up by one column each time, so that finally the least significant digit appears in column 1.

Where amounts are to be recorded in cash sterling, the pounds (£) button of keyboard 10 is pressed, and then the button corresponding to the most significant digit of the number of pounds. This appears in column 1 of the display 2', and on pressing further digits corresponding to, for example, tens or hundreds of pounds, the first number is stepped to the left in the manner described above, except that column 2 is by-passed so that the first number appears in column 3 and the second now in column 1. This operation may be continued, stepping the digits into columns 4, 5 etc., consecutively, until the shillings and pence are also recorded. Where the number of shillings is ten or more, the ten shillings (10/-) button is pressed followed by a button representing any one of the digits from 0 to 9. On pressing the ten shillings button, a 1 appears in the column A without causing the previous pounds digits to be stepped. However on pressing the following shillings digit (from 0 to 9) this latter appears in the column 1 and the pounds digits are stepped to the left so that they appear in columns 3 and upwards. If the number of shillings is less than ten the "0" button must be operated prior to recording the single digit number.

When recording pence, the shillings digit moves to column 3 and the pounds digits to columns 4 and upwards. The pence digit appears in column 1, unless one of the special ten pence (10d) or eleven pence (11d) buttons, are operated, in which case the two digits appear in columns 1 and 2. For ease in checking a background light is arranged to appear in columns A and B as soon as the first digit of the cash amount is recorded.

The console contains a printer 15 which prints all data set up on the console, including that from the alpha numeric keyboard 14, so as to provide a reference copy. Normally a block of data is arranged to appear on one line of printing on the reference copy. It is desirable for the blocks of data to appear in a standard form for that particular type of data, so that the reference copy may be readily interpreted. That is, on pressing the various transaction, customer, and other buttons distinctive code letters and/or numbers appear on the printer copy which indicates that the immediately following information represents a type of transaction, a particular customer, and so on. It is further desirable that a distinctive punctuation symbol should appear immediately after any given item of information, the particular symbol being applicable only to information of that class. The keyboard buttons are therefore connected to format means so that the code letters and/or numbers and the punctuation symbols are automatically transmitted on pressing a button of the keyboard concerned.

It should normally be so arranged that the computer can send messages in response back to the console, which messages may inform the operator of certain facts particular to the information being set up. For example, certain goods may be out of stock, or the particular customer may be on a top list. It is convenient that such messages in response be printed on the printer reference copy and accordingly a control system must be available for ensuring that the printer receives messages from only one source at any one time. So that an incoming message from the central computer may be temporarily stored should the printer be in use at that moment, a buffer can be provided between the printer and the inward transmission line for this purpose.

Once all the information pertaining to a particular transaction has been set up, this fact is recorded by the operator pressing the "Block Complete" button 16.

To enable items of information to be set up which are outside the scope of the keyboards 3 to 13 use is made of the alpha numeric keyboard 14. Before using this keyboard the "Alpha" and "Start" buttons are pressed in the keyboard 13, causing appropriate characters to be set up and at the same time inhibiting the setting up of further information by means of the keyboards 3 to 13 so as to avoid confusion. The alpha numeric information is then transmitted. This most suitably is sent as a series of blocks each corresponding to a line of type. It is preferred that there should be provision for automatically transmitting a block at the end of each line of type and for automatic carriage return and line feed. An "Alpha End" signal is sent by the operator at the end of the alpha numeric information by operation of the appropriate buttons, and is also sent automatically at the completion of each line of type.

Pressing the "Block Complete" button 16 also sets in train a process which determines whether a transmission line is free for sending the data set up directly to the computer, or whether it is necessary to store the information on a suitable recording medium for subsequent transmission when a line is available. Punched paper tape is convenient for storing such information, and therefore the apparatus preferably also includes a paper tape punch. A paper tape reader is also required in such circumstances, for subsequently reading the punched paper tape formed and passing the data to the computer.

Where the number of certain specific items of information is relatively small, each different class of data can be allotted a different code, and the computer can be programmed to recognise that code as referring to the particular data in question. However, where the apparatus requires to be able to handle a multiplicity of different types of information, it is preferred not to rely solely on different codes for each type, but to set the information out in a standard order or format, so that the computer can be programmed to treat each format in a constant manner, this enabling the same particular character to be used to indicate different items of information, the different meanings being dependent on the various positions of the character within the block of data transmitted. It is feasible for the operator of the apparatus to set up the information in the appropriate order himself, but it is much to be preferred that the apparatus itself be capable of arranging the information in a predetermined format. This enables the operator to set up information as received (though this setting up of information may require a standard procedure as mentioned above) the order of receipt of the information then being immaterial.

The system thus allows of double or treble checking, for if the computer is programmed to expect a different format for each transaction and if varying code letters and punctuation are used and transmitted according to the different types of data making up the various transactions, then an error is likely to be immediately noted.

Table 1 sets out below various code symbols that may be used and their significance in respect of the main transaction classes, and also the sub-classes thereof where appropriate. Table 1 also shows punctuation symbols that may be used to indicate within any block of information the end of one class of data, so as to separate it from data representing a different class following in the same block. Punctuation symbols are not necessary for a class of data appearing at the end of a block, and accordingly punctuation symbols are not allocated to certain classes in Table 1.

TABLE 1

| Class | Sub-class | Punctuation symbol |
|---|---|---|
| 1 = Transaction | A = order | : |
|  | C = cash collection |  |
|  | D = delivery |  |
|  | S = stocks, etc |  |
| 2 = Customer | A, B, ... WXYZ = customer groups |  |
|  | A, B, ... W = column reference |  |
| (3 = Customer) | A, B, ... W = row reference |  |
| 4 = Product | A, B ... etc. = product groups | , |
|  | A, B ... W = column reference |  |
| (5 = Product) | A, B ... W = row reference |  |
| 6* = Packing code | A, B ... etc. = packing units |  |
|  | 1, 2 ... 10 |  |
|  | 1, 2 ... 10 |  |
| 7 = Special features | A = access details | ; |
|  | C = customer reference |  |
|  | D = date |  |
|  | P = point of delivery |  |
|  | R = supplier reference |  |
|  | T = time, etc |  |
| £ = Cash |  |  |
| blank = Quantity |  | - |
| + = End of message |  |  |

*Not transmitted or printed, but set up for use in format control.

It will be noted that there are two code symbols each for customers and for products. The symbols 2 and 4 respectively would normally be used, the symbols 3 and 5 being kept in reserve as spares should the numbers of customers and/or products exceed the total that can be accommodated by means of the sixteen 16×16 customer and product groups.

The class code symbols are set up automatically. Thus, for example, on pressing the "Order" button in the transaction keyboard 3 there is set up firstly the transaction code signal "1," the order symbol "A" and then the punctuation symbol ":". Similarly on pressing a "Customer Group" button on the keyboard 4, there is automatically set up the customer symbol "2" and the appropriate symbol for the particular customer group selected. On pressing the column and row selection buttons of keyboard 9, corresponding symbols are set up immediately after the customer group symbol. No punctuation is required, as the group of symbols representing a customer appear at the end of each block of information, and accordingly the "end of block" punctuation symbol "/" is sufficient. A similar procedure takes place on pressing a "Product Selection" button of keyboard 8. On pressing one of the "Unit" buttons of keyboard 12, a packing code symbol 6 is set up for purposes of determining the format to be used. However it is unnecessary to transmit or print this symbol, which therefore does not appear in any of the positions of the block of information. The special features symbol "7" is set up on pressing any of the buttons of keyboard 6, followed by the appropriate sub-class symbol. This in turn may be followed either by symbols representative of the features of any of the buttons of keyboard 7, or alpha-numeric information may be inserted. It may be noted here that where a date includes the month of October, November or December, these may most suitably be represented by the numerals "10," "11," and "12," each such numeral occupying a single position.

If alpha-numeric information is to be used, positions are left blank that might have been occupied by symbols representative of the features of the buttons of keyboard 7, a block complete signal is sent, setting up the "end of block" punctuation "/", and then the alpha-numeric information is set up using the keyboard 14. This alpha-numeric information is preceded by "(". No symbol need be sent to denote the end of an alpha-numeric message, but it is necessary to operate a button or buttons indicating this, in order to remove the inhibition which otherwise prevents the setting up of further coded information by means of the keyboards 3–13.

When setting up a simple number representing a quantity, no class symbol is used, but a blank is set up and transmitted instead, the digits representing the quantity following immediately. The digits are then ended with the punctuation symbol "-."

In the course of transmission control checks are instituted to ensure, as far as is reasonably possible and economic, (a) that the right signals have been generated by the apparatus, and (b) that whatever signals are sent out from the apparatus are received unchanged by the computer. In the described embodiment the information is set up in a four element code, and is therefore composed of a series of character quartets. To check that the right signals have been generated therefore, a fifth element may be included with each character quartet to provide either even or odd parity as desired (which may depend on the particular transaction or particular item of information) and a check can then be made on each character just before it leaves the apparatus for whether the parity is as desired. Should the check show a fault, an indicator is actuated and the operation is locked until the fault has been cleared.

The check on the signals received by the computer is made by the apparatus carrying out a simple arithmetic process, such as cyclic totalling, prior to transmission of the data, and the check result obtained is converted to a signal which then is included in the check result obtained by the apparatus is added to a figure representative of the particular transmission terminal, where more than one such terminal is connected to the computer, and the computer, and the computer checks this also by adding on the code to the other check result. In this way, a check is also made that the computer has correctly identified the terminal transmitting the particular information.

Except in the case of sending alpha-numeric information, the "block complete" button automatically sets in train the checking process such as cyclic totalling, mentioned above, and the check result is automatically transmitted immediately after the end of block symbol "/."

In Table 2 below there are set out a series of exemplary formats and blocks of information using the code symbols of Table 1. The data of Table 2 are set out in twenty four columns in each of which is a separate character for transmitting to a printer. The twenty four columns are grouped into pairs to form twelve signal groups, since the apparatus described is arranged to transmit pairs of characters to the computer rather than single characters. Table 2 sets out in the extreme left-hand column the type of information contained in each block, and certain details are spelt out in the extreme right-hand column, where this is not otherwise self-evident. It is to be noted that each block of information is preceded by the numeral 1 and either an asterisk (*) or a blank. This provides an identification number of the apparatus or the terminal to which it is connected. Each message sent by the apparatus opens with a start block consisting of a call sign "$", followed by the station identification number, which in the present instance is "1", a punctuation symbol ":" and then the appropriate message serial number. This opening block is then terminated with the "block complete" symbol "/" followed by the check result obtained by, for example, cyclic totalling, as mentioned above. In Table 2, this check result is denoted throughout by "X."

The logical relationship between the various functional units of the apparatus is illustrated in FIG. 16(a) and 16(b). Block diagrams of these functional units and of individual components thereof are illustrated in FIGS. 17 to 28.

The system of recording control of FIG. 16 centres around the source of the data, block 19, designated Data Setting Up. This will be described in more detail below in connection with FIG. 17 and FIGS. 18(a) and 18(b), but for the present it is sufficient to state that this corresponds substantially to the collection of keyboards 3–13 of the console. Information is passed from the Data Setting Up unit in two direction primarily, to a Transmission Character Control 20 for onward transmission to the computer or paper tape punch, and also to a Printing Character Control 21 for onward transmission to the printer 15. In the figures single lines are generally drawn to indicate the provision for transmitting signals from one unit to another, but it will be understood that in practice a plurality of lines may be used for any one type of information, sixteen lines commonly being provided for use in transmitting all the possible characters available in a four element code, by energising a single one line of the sixteen for anyone character.

Leading from the Data Setting Up unit 19 to the Transmission Character Control 20 are six sets of lines 22, 23, 24, 25, 26 and 27. These carry respectively information relating to the apparatus or console station number, for use in a system including several consoles; the serial number of any one message being transmitted; various control signals; class symbols for indicating the class information to which particular data relates; data characters; and punctuation symbols for separating one class of data from the next. Exactly corresponding lines 22'–27' lead from the Data Setting Up unit 19 to the Printing Character Control 21.

A further line 28 from the Data Setting Up unit carries signals for use in determining the format of the information eventually to be transmitted and printed, which format varies according to the type of transaction under consideration.

Three lines 29, 30 and 32 lead between the Data Setting Up unit 19 and the operation control 31. These lines are arranged to receive signals produced respectively on operation of the "Day Start" "Message Start" and "Message End" buttons in keyboard 13 designated 29', 30' and 32' respectively in FIG. 16. A further line 33 leads from the Data Setting Up unit 19 to the operation control 31. This carries signals indicating that one of the various character denoting buttons has been operated.

The Transmission Character Control 20 receives information along the lines 22–28, as already described, and in addition has a further input line 35 for receiving pulses, the purpose of which will be described below. An output line 36 carries data from the Transmission Character Control to the Transmission Element Serialiser 37, and a line 38 carries signals from the Transmission Character Control to the Transmission Element Serialiser, for use in connection with the block check result which is formed for each block of signals. Finally an output line 39 carries signals from the Transmission Character Control to the Operation Control 31 for use in indicating when transmission of the information has been completed.

The Transmission Element Serialiser 37, which is illustrated in more detail in FIG. 23, described below, is connected to the Transmission Character Control 20 through the lines 35, 36 and 38 as already described. In addition a line 40 provides an input for 110 baud pulses, and a line 41 carries signals from the operation control 31 to a gate in the Transmission Element Serialiser for controlling the input of the pulses from line 40. The object of the Transmission Element Serialiser is to take character signals in parallel from the Transmission Character Control 20 to form eight signal elements in series, these suitably being preceded by a Mark Start element and

TABLE 2.—SIGNAL GROUPS AND PRINTER POSITIONS
(For Station No. 1)

| | Signal Groups | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | Printer Positions | | | | | | | | | | | |
| | 1 2 | 3 4 | 5 6 | 7 8 | 9 10 | 11 12 | 13 14 | 15 16 | 17 18 19 | 20 | 21 22 | 23 24 |
| Start block | ⌀ Call sign | | | | | | | | | | | | Signals for ⌀ and X are 8 element. |
| (Transmission Code) | 00000101 | 0001 0011 | 0001 0010 | 0011 0100 | 0101 1111 | 0101010l | | | | | | |
| Order/Customer block | 1 * or blank | 1 A | : 2 | A B | C / | X | | | | | | |
| Product | 1 * or blank | * Bl 2 | , 3 | , 5 | , 6 | 7 | - 4 | B T | R , | G 6 | 4 / | X | Quantity, product, 64 gallons. |
| Cash | 1 * or blank | £ 1 | 2 3 | , 4 | 5 6 | , | 2 , | - N̄ / | X | | | | £123,456. 12s. 11d. |
| Stocks | 1 * or blank | 1 S | : 7 | D 1 | 1 . | 5 | X | | | | | | Stocks, date (11th May). |
| Date | 1 * or blank | 7 D | Bl Bl | ; 2 | 1 . | 1̄2̄ / | X | | | | | | Date, 21st December. |
| Time restriction | ⎧ 1 * or blank | 7 T | F Bl | 1 3 | . 3 | 0 ; | 1 5 | . 3 | 0 / | X | | | Between 1.30 p.m. and 3.30 p.m. |
| | ⎨ 1 do | 7 T | A Bl | Bl Bl | : Bl | Bl ; | 1 2 | . 3 | 0 / | X | | | After 12.30 p.m. |
| | ⎩ 1 do | 7 T | B N | Bl Bl | . Bl | Bl ; | Bl Bl | . Bl | Bl / | X | | | Before noon. |
| Access restriction | 1 * or blank | 7 A | Bl Bl | ; 2 | 0 0 | 0 / | X | | | | | | Limit 2,000 gal. tanker. |
| Supplier reference | 1 * or blank | 7 R | Bl ; | 1 2 | 3 4 | 5 / | X | | | | | | |
| Customer reference | 1 * or blank | 7 C | B X | | | | | | | | | | |
| Alpha numeric | 1 do | (!) ( | | | | | | | | | | | Block has no end position. |
| Point of delivery (using display code) | 1 * or blank | 7 P | B A | B / | X | | | | | | | | Referring to details going before. |
| Point of delivery | 1 * or blank | 7 P | A Bl | Bl / | X | | | | | | | | Refers to details to follow. |
| (Using alpha) | 1 do | (!) ( | A L | P H | A | (All alpha numeric signals are 8 element characters) | | | | | | | Block has no end position. |
| (Transmission Code) | 0001 0000 | 1011 1000 | | | | | | | | | | | |
| Message End | 1 ! or blank | + Bl | X | | | | | | | | | | |

[1] Alpha class.
* Bl = blank throughout.

followed by two Space End elements. The coded signal elements from the Transmission Element Serialiser are fed through an output line 42 which leads to a gate 43 and from thence through a line 44 to a gate 45. The gate 45 has two outputs, one being connected to a transmission line for transmitting information to the computer and the other being connected to a paper tape punch. The gate is controlled by signals received from the Operation Control 31 along lines 61 and 62 such that signals received from the line 44 are normally passed to the transmission line, as a result of a voltage on the line 61. However, if this is not available at the appropriate moment a voltage appears on the line 62 instead of line 61 and the gate is switched to pass the signals to the paper tape punch.

The connections to the Printing Character Control 21 are substantially the same as those to the Transmission Character Control 20, except that certain modifications are made to take account of there being no unit corresponding to the Transmission Element Serialiser 37. There are the corresponding input lines 22'–27' and 28, and an output line 46. This output line leads through a gate 47 to a further line 48 for passing characters to the printer 15. For use in generating the characters for printing, a pulse input line 49 is required, this leading to a gate in the Printing Character Control, which gate is controlled by signals passed from the Operation Control 31 along a line 50. A further line 51 leads from the Printing Character Control to the Operation Control for indicating that a particular printing operation is completed.

The console contains an alpha numeric keyboard 14, and the output of this is passed on a line 52 to a gate 53 having two outputs 54, 55 which are taken to the gates 43 and 47 respectively. The gate 53 is provided with control lines 41 and 57, for carrying signals indicating respectively that a transmission line has and the printer have been allocated and either or both of the outputs 54 and 55 is or are opened accordingly.

In an alternative embodiment the gate 53 has a single output which is subsequently divided and taken to the gates 43 and 47. In such a case no signals flow through the gate 53 unless signals appear on both lines 41 and 57 simultaneously.

The Operation Control 31 is illustrated in more detail in FIG. 28 described below. The main purpose of this control is to permit the setting up of data provided conditions are suitable for the data to be transmitted, stored or printed, as the case may be, and otherwise to inhibit such setting up of data. The Operation Control furthermore is arranged to provide signals for permitting the passing of data either to a transmission line or paper tape punch or to a printer, depending on the availability of these various units. Thus in addition to the connections already detailed, lines 65 and 66 provide outputs for signals indicating to a terminal transmission control 67 and a printing control 68 respectively that data have been set up and are ready to be transmitted and printed. The terminal transmission control is provided to control the allocation of the transmission line to the computer between the several sets of data collection apparatus in a terminal. A pair of lines 58 and 59 connect the terminal transmission control to the Operation Control for sending signals indicating respectively that a transmission line has been allocated to the apparatus and that this transmission line is available for use. The printing control 68 is required to control the connection of the printer 15 to the apparatus so that the printer can be made available to receive messages from the computer. These messages must have priority, and the control is therefore required to inhibit the passing of information to the printer whenever a message is being sent. Accordingly, whenever a block of data from the apparatus is complete, a signal is sent to the printer control requiring it to make the printer available as soon as possible. If a message is being received at that instant from the computer, a signal is thereupon sent from the printer control to the operation control along a line 69, to indicate this fact and that the passing of information to the printer will therefore be temporarily inhibited.

The Operation Control 31 is provided with an input line 70 from the block complete button 16, and an input line 71 containing a switch 72 for receiving a signal when the apparatus is switched on.

The block diagram of the Data Setting Up unit 19 is shown in FIG. 17. The basic Unit of this is the data registration block designated 100. This has a plurality of groups of output lines 25, each group corresponding to one of the keyboards 3 to 12. Each group is connected to a different one of the keyboards and contains a plurality of lines at least equal to the number of buttons in its keyboard. The keyboards are connected to a voltage source, and generally each button is connected to a different one of the output lines 25, whereby on pressing one of the buttons an output line is energised that is uniquely distinctive of that button. Alternatively, as described in connection with FIGS. 29–36, each button may include an automatic coding device which enables the voltage source to be connected to a selection of a plurality of output lines, conveniently five, that is unique, at least within the keyboard concerned, to that button. (The term "selection" is to be understood as including, in this context, connecting the voltage source to all the output lines available.) Accordingly there are a plurality of groups of output lines 25 as shown leading to the Transmission Character Control 20. For clarity, the corresponding lines 25' leading to the printing character control 21 have been omitted from FIG. 17, but it will of course be understood that these lines also originate from the data registration 100. Typical of the characters that may appear on these lines 25 are those representing numerals, customer and product groups, and particular selections of columns and rows relating to individual customers and products.

The Data Setting Up unit 19 also contains a Call Signal Register for emitting on line 22 a call signal that may be sent at the start of each message; a Station Number Register for emitting on line 23 a signal representative of the station number for preceding every block of information set up; a Message Serial Number Counter for emitting on line 24 signals representative of the serial number of each message and for stepping each number up by one on operating the Message Start or the Message End button of keyboard 13; and a Punctuation Symbol Register for emitting character quartets representative of all the punctuation symbols required on a corresponding number of groups each of four lines, designated generally 27.

A group of lines 26 is provided to carry characters indicating where appropriate the class of data to which certain of the buttons relate. Thus if a button of the customer group selection keyboard 4 is operated, a character representing the code numeral "2" is set up (see Table 1 above) in addition to signals representative of the particular customer group being set up on output lines 25.

Correspondingly, characters representing the code numerals "4" and "7," for example are set up on operating any one button of the product group selection keyboard 8 and of the special features keyboard 6 respectively.

Sixteen further output lines 26 from the block 100 are arranged to carry signals representing particular types of transaction, these originating from the transaction buttons of keyboard 3. These lines pass through a transaction register 102, which contains a number of flip-flops each connected to one of the lines 26. Energising any one line 26 causes its associated flip-flop to switch and emit a continuous voltage on one of sixteen lines 26a on leading to a block format determination unit 104. The block format determination unit is also connected as shown to the lines 26 originating from, for example, the customer and product group selection keyboards 4 and 8, and is connected through lines 28 to the Transmission Character Control. The block format determination unit 104 determines the arrangement in which the data set up is stored in the Transmission Character Control 20, this arrangement being described in more detail below. For each desired arrangement a different one of the lines 28 requires to be energised. Accordingly the unit 104 consists of a number of gating circuits so arranged that a single line 28 is energised for each transaction and/or class signal that may be set up on the lines 26 and 26a, whereby a format appropriate to that transaction and/or class is determined in the Transmission Character Control 20.

The lines 25 originating from the numerical keyboard 10 pass through a numerical digit positioner 101. This is illustrated in detail in FIGS. 18(a) and 18(b). It will be seen that there are inputs from each of the digit buttons 0 to 9 and from the additional cash buttons 10d, 11d and 10/-. On pressing any one of the digit buttons 0 to 9, a signal is caused to pass to a gate 110 and thence to a digit sequence control 111, and, at the same time, a signal also passes into a first digit register 112 along the appropriate line. The first digit register has ten output lines 25' as shown, one for each digit. Each of the lines 25' is also taken to one of ten stepping gates 113. The outputs of the stepping gates 113 are taken via lines 25a', 25b', etc., to a second digit register 114. This second digit register has ten output lines designated generally 25'', each of which is branched to form digit lines 25a'', 25b'', etc. These latter are taken through further stepping gates 115 to a third digit register 116. This in turn has ten output lines 25''', branched to form digit lines 25a''', 25b''', etc., each of these latter being taken to stepping gates 117. It will be recalled from the description of FIG. 15 that the apparatus of this embodiment has provision for up to nine digits, and accordingly the numerical digit positioner 101 contains nine digit registers, all being arranged with respect to each other in the same way as that just described for the registers 112, 114 and 116 illustrated in FIGS. 18(a) and 18(b). Each of the nine digit registers has ten output lines corresponding exactly to the output lines 25' and 25'' illustrated, and thus nine separate groups of output lines are taken to the Transmission Character Control described below. The stepping gates 113, 115, 117, etc. between each pair of adjacent digit registers are triggered by pulses from the digit sequence control 111. These pulses are in turn emitted in response to the signals received through the gate 110 consequent on pressing any one of the digit buttons 0 to 9. The stepping of digits in setting up numerical information has been described above. It will accordingly be apparent that on pressing the button corresponding to the most significant digit of a particular number, the appropriate line leading to the first digit register 112 is energised. A signal is also passed to the digit sequence control 111, but this remains quiet at this stage. On pressing a further button, corresponding to the next most significant digit, a signal passes through the gate 110 to the digit sequence control 111, and this time a pulse is emitted along an output line 120. This pulse is taken to all the gates 113, to open them, thereby allowing the digit originally set up in the first digit register to be passed to the second digit register. (Where a cash amount is being set up arrangement is made to by-pass the second digit register 114. This is described in detail below.) At the same time, the line corresponding to the second digit and leading to the first digit register 112 is energised to set up the second digit therein in place of the first.

The pressing of a button for the third digit causes this operation to be repeated; that is, a pulse now passes along a second output line 121 of the digit sequence control 111 to open all the gates 115 between the second and the third digit registers 114 and 116. At the same time, a second pulse is passed along the line 120 to cause the gates 113 again to be opened temporarily. Thus on pressing the button for the third digit, the first digit is stepped into the third digit register, the second digit is stepped into the second digit register, and the third digit appears in the first digit register. The recording of a fourth digit similarly causes a pulse to be emitted on an output line 122 of the digit sequence control 111 in addition to further pulses on the lines 120 and 121, with corresponding effect on the stepping gates 117 in addition to operating the gates 113 and 115 once more. It will now be seen that for each digit there is a digit line taken to the first digit register and to each of the higher order digit registers in turn, which line is interrupted by a stepping gate between each register. Thus operating the button representing "1" causes the line 25b to the first digit register to be energised, and for each further order of digits set up, a signal passes along the lines 25b', 25b'' etc.

The cash buttons 10 and 11d have their own registers 124 and 125 respectively. Output lines shown generally as 25 are taken from these two registers and grouped with the lines 25' from the first digit register. Lines are also taken from the cash buttons 10d and 11d to the gate 110 and thence to the digit sequence control 111, so as to provide the desired digit stepping pulses for stepping previously recorded figures into higher order digit registers. However there is no need of course to provide for stepping of amounts entered in either of the registers 124 or 125, since no further numerals are required to be subsequently recorded.

The ten shillings (10/-d) button controls the energising of the 10/-d register 126. The output line 25 of this register is placed between the lines 25'' and 25''' of the second and third digit registers respectively, since, as is apparent from inspecting FIG. 15, a special position is provided for registering tens of shillings, which position is fixed and not stepped in subsequent operations.

As already mentioned, provision is made to by-pass the second digit register 114 when recording cash amounts. The effect of this is to leave the second column of the screen 2' of FIG. 15 vacant, so that a "1" can be inserted whenever "10d" and "11d" appears in the cash figure. As already mentioned, a "1" appears in the column A of the screen 2' where the number of shillings is ten or more, and the circuit arrangement of FIGS. 18(a) and 18(b) causes the remaining digit of the amount of shillings to appear in the third column adjacent column A.

The second digit register 114 is by-passed by means of branch lines 125a', 125b', 125c', etc., being taken respectively from the lines 25a', 25b', 25c', etc. Each of the lines 125a', 125b' etc. is taken through one of a series of separate AND-gates 126 to gates 127. The gates 127 also receive at their inputs the lines 25a'', 25b'', 25c'' etc., coming from the second digit register 114, and the outputs of the gates 127 are taken to the individual digit positions in the third digit register 116.

The lines 25a', 25b' or 25c', etc. each contain one of a series of OR-gates 129. A line 130 leading from the "Sterling" button of keyboard 3, which is energised when setting up cash amounts, has a series of branches 130a, 130b, 130c, etc. leading to all the gates 126 and 129. A voltage on the line 130 accordingly closes all the OR-gates 129 and opens all the AND-gates 126. In this way, signals from the stepping gates 113 are taken directly to the third digit register 116 via the gates 127, and access to the second digit register 114 is prevented.

The Transmission Character Control 20 is illustrated in FIGS. 19(a) and 19(b). Data are fed along the input lines 22-27 to a transmission character selector 200. This transmission character selector is a means for storing the data supplied to it and is built so as to have a substantial number of different positions each capable of storing a character fed to the transmission character selector. Normally at least the majority of the positions will each contain sixteen signal wires for linking to the groups of up to sixteen output lines from the Data Setting Up unit so that each wire is linked to a different output line of each group. A number of positions however may usefully contain four or five signal wires only for receiving character quartets such as are emitted on lines 27 by the punctuation symbol register in the Data Setting Up unit 19(a). Position 4 of the selector 200 of FIG. 19 is shown as being of this type, having five output wires 202'''' to carry the character quartet and a parity element. In the embodiment described, the particular position in the transmission character selector to which any set of data is fed is controlled by the block format determination unit 104 of the Data Setting Up unit 19. As will be explained below, the positions of the transmission character selector are read sequentially for feeding the data stored therein to the computer, and the computer is programmed to treat the data differently according to the code symbols and punctuation used and to the position of the data items in the block set up in the transmission character selector. Thus identical code signals can be used to represent an individual customer or product, or a particular number, without confusion arising owing to the use of different prefix code symbols and the storage arrangement provided.

The transmission character selector is illustrated in more detail in FIGS. 20(a) and 20(b). This shows in outline parts of the first and fourth of all the positions provided. Each position has a series of character selectors 201 such as 201a', 201b', and 201c' in position 1 and 201a'''', 201b'''' etc. in position 4. Each character selector 201 incorporates a gate which is triggered by one of the variety of possible format signals available on any one of the lines 28a, 28b, 28c, etc., which together make up the input line 28.

Thus if transaction and/or class buttons have been operated so as to cause the block formation determination unit 104 to emit a format signal on line 28a only then only the character selectors 201a', 201a'' . . . 201a''' . . . etc. will be switched to receive characters set up on the lines 22–27, the gates of the remainder being kept closed. As the selectors 201a', 201a'' etc. are each connected to one group only of sixteen or four individual wires appropriate to the transaction concerned only one character is received in each position, and this will be stored when set up irrespective of the order of setting up the individual characters of that transaction. In certain cases however certain character selectors may be linked together and both be connected to the same group of wires, such as the group representing the column and row selection for the individual customers or products of a group. In such a case it is arranged by suitable gating that only the first selector receives the first signal, representing a column, and that this signal prevents the first selector from receiving a further signal from the group of wires and opens a gate to the second selector, which latter can then receive a subsequent signal representing a row.

Alternative formats are provided by connecting the other series of character selectors, e.g. 201b', 201b'' etc., and 201c' and 201c'' etc., to different lines 22–27, and by causing a format signal to appear on the other format lines 28b, 28c etc., making up the line 28.

Each of the character selectors intended for connection to a group of sixteen wires itself has sixteen output lines, so that a voltage appearing on any one of the sixteen wires may be stored without coding, i.e. without any change in form. A selector connected to a four wire line has a five line output for transmitting a character quartet together with a parity element. These output lines are joined to bus-bars 202', 202'' etc. leading to a series of character releasers 203', 203'' etc.

The operator sets up a complete block of information according to standard routine by operating the keyboards in the console 1 in the appropriate manner. The "block complete" button 16, is operated and immediately thereafter, in response to a "line allocated" signal on line 58 from the terminal transmission control 67, a transmission flow signal appears on the line 41, permitting pulses to flow on the line 35 to a block group sequence control 209. This controls the passing of the information set up, including punctuation symbols and other characters determined automatically on making the choice of format, from the positions in the transmission character selector by sequential operation of the character releasers 203. Where character releasers are connected to character selectors having sixteen output wires, the releaser outputs are taken to a character encoder 208. The characters appearing on the outputs of selectors having five wire outputs are however already in a code suitable for transmission and so these outputs by-pass the encoder 208.

The block group sequence control 209 has a series of output lines 240, 241 etc. each of which is divided into at least two branches such as the lines 240a, 240b and 241a, 241b. The lines 240a and 240b are taken respectively to the character releasers 203' and 203''. Similarly, the two branches 241a and 241b of the line 241 are taken to the next two character releasers, 203''' and 203'''', receiving the information from position 3 and 4 of the transmission character selector 200, and so on so as to provide lines between the block group sequence control 209 and all the character releasers present.

Group step pulses are provided from the Transmission Element Serialiser 37 along the line 35 when the information may be further transmitted. These pulses appear sequentially on the lines 240, 241 etc. of the block group sequence control, and act on gates in each of the character releasers in turn so as to release the data from each pair of positions in turn. Thus pulses on the line 240 release characters on the lines 212' and 212'' to the character encoder 208.

The operation of the character releasers is best described with reference to FIG. 21, illustrating the releasers 203''' and 203''''. Character releaser 203''' comprises a series of sixteen gates 214 each controlling the passages of a character from one of the sixteen lines 202''' to one of the sixteen lines 212''' and actuatable by a pulse on the line 241a. The character selector 203'''' on the other hand requires only five gates 215, each connected to one of the five wires of line 202''''. The same pulse on the line 241 passes on the line 241b to open all the gates 215 and to release the character on the line 202'''' to the five wire line 212'''.

The block group sequence control is so arranged that only one pulse or only one group of pulses appears on the lines 240, whereafter the next pulse or group of pulses appears on the subsequent line 241. The effect of this is to release the information from the character releaser 203''' to the character encoder 208 after the latter has already encoded and transmitted the information received from the character releasers 203' and 203''. This operation is continued until all the pairs of character releasers have been opened in turn.

Certain of the outputs 240, 241 etc. from the block group sequence control 209 have a third branch such as the branches 241c, 242c, 243c and 244c illustrated, these leading to the transmission character selector 200. As may be seen from FIG. 20(b), each format ends with a pair of AND-gates 216 and 217 the outputs of which are joined respectively through gates 218 and 219 to respective common output lines 204 and 205. FIG. 20(b) shows, by way of example, lines 245c, 246c, 247c and 248c leading to these gates 216 and 217, which lines may be regarded as third branches of output lines 245, 246, 247 and 248 respectively (not shown) from the block group sequence control 209. Thus when a format signal appears on line 28b, for example, a pulse on the line 245c cannot pass either of the gates 216 to which it is shown connected. However a pulse on the line 246c passes through the gate 216 controlled by format line 28b to gate 218 and line 204. The next pulse appears on line 247c and this passes through the gate 217 controlled by format line 28b to gate 219 and line 205. Similarly it will be seen that if the format signal were to be on line 28d, a pulse would first pass to gate 218 and line 204 from line 247c and then to gate 219 and line 205 from line 248c. As will be explained more fully below, a pulse on the line 204 releases for transmission the result of a block check process, such as cyclic totalling. A pulse on the line 205 indicates the end of a block group, and is used to reset the block checking means and for other operation control purposes.

Those of the lines 212', 212', etc. that contain sixteen constituent wires lead to the character encoder 208. The operation of this is illustrated in FIG. 22. As already mentioned, sixteen lines generally make up any one of the input lines 212, and each of the constituent wires is taken to one of a series of gates 220 and 221, i.e. 220', 220'', etc. and 221', 221'' etc. The connections to the gates 220 and 221 are arranged such that input lines from the odd positions of the transmission character selector 200, such as input lines 212' and 212''', are taken to the gates 221', and 221'', etc., while input lines from even positions of the transmission character selector, such as input lines 212'' and 212'''' are taken to the series of gates 220', 220'' etc. There are sixteen gates in the series 220, and sixteen in the series 221. Thus, the first of the sixteen constituent lines of the several inputs 212 are all taken either to the gate 220' or the gate 221', depending on the position in the transmission character selector from which they come. The second of the sixteen constituent lines of the inputs 212 are taken either to the gate 220'' or to the gate 221''. Corresponding connections are made for all the other constituent lines, the effect being to combine with any one constituent line of an input coming from an odd position in the transmission character selector all the corresponding constituent lines of the other inputs from the odd positions, and similarly for inputs from the even positions.

Two groups of sixteen lines emerge from the gates 220 and 221 respectively these being designated from 220/0 to 220/15 and from 221/0 to 221/15 in FIG. 22. The character encoder 208 has ten outputs leading from gates 224/1–224/5 and 225/1–225/5. The former group of five gates are connected to the lines 220/0–220/15, and the latter five gates are connected to the lines 221/0–221/15. The manner of connection determines the code in which the data set up in the apparatus is transmitted. In the embodiment described making different connections to only the first four gates 224/1–224/4 and 225/1–225/4 is sufficient to provide a different code for each of the sixteen possible different lines on which a signal may appear, while the fifth gate of each set, 224/5 and 225/5, are connected to the lines whenever necessary to achieve odd parity. As will be seen from the figure, no connection is made from the line 220/0 to any one of the gates 224/1 to 224/4. Line 220/1 is connected to gate 224/1, line 220/2 is connected to gate 224/2 only, line 220/3 is connected to gates 224/1 and 224/2, and line 220/4 is connected to gate 224/3 only. Further connections are made for the remaining lines 220/5–220/15, and these may conveniently be made in accordance with the binary scale, that is, a connection is made to gate 224/1 whenever the digit 1 appears in the first binary position of a number when counting from 0 to 15, a connection is made to the gate 224/2 whenever the digit 1 appears in the second binary position, and similarly for the remaining gates 224/3 and 224/4. Exactly corresponding connections are made to the other gates 225/1–225/5.

As mentioned, the outputs from character releasers connected to positions of the transmission character selector having five wire outputs by-pass the character encoder. Thus such coded outputs are taken directly to gates 228/1 to 228/5 and 229/1 to 229/5 which gates also receive the outputs 224/1 to 224/5 and 225/1 to 225/5 respectively from the character encoder. The line 212'''' is shown leading to all the gates generally but in fact the character releasers with coded outputs, are joined, according to whether they are connected to even or odd positions of the transmission character selector, to one of two five wire output lines, one wire of each line being connected to the corresponding wire at the outputs of the character releasers connected to that line. Two five wire lines are accordingly required to connect each pair of the character releasers with coded outputs to the gates 228/1–228/5 and 229/1–229/5, the first wires being taken to gates 228/1 and 229/1, the second to gates 228/2 and 229/2 and so on.

Coding in encoder 208 is virtually instantaneous and accordingly the output of character releaser 203''' appears after encoding simultaneously with the coded output of the releaser 203'''' at the gates 228/1–228/5 and 229/1–229/5. It will thus be seen that a ten element output is obtained for all the characters set up as a result of taking every pair of positions of the transmission character selector together. In practice these ten elements are transmitted one immediately after the other.

As will be seen from FIGS. 19(a) and 19(b) 225/4 of the character encoder 208 the outputs 224/1–224/4 and 225/1– are taken both to a block check generator 27 and to gates 228/1–228/4 and 229/1–229/4, while the outputs 224/5 an 225/5 are taken respectively to gates 228/5 and 229/5 only. The block check generator 227 totals the number of impulses on the various lines 228/1–228/4 and 229/1–229/4, and after release of a block to be transmitted from the transmission character selector, a signal is passed on line 204 which release a block check result character representing the total number of impulses from the block check generator along lines 230/1–230/8 to the gates 228/1–228/4 and 229/1–229/4. When this group has been tranmsitted, the block check generator is reset so as to be ready to count for the next block of data by the signal passed along the line 205 indicating the end of the message.

The coded signals are transmitted along the line 42 [FIGS. 16(b)] after processing by the tranmission element serialiser 37, which is illustrated in FIG. 23. The effect of this corresponds to the operation of the release of data from the various positions of the transmission character selector, in that each of the elements of the coded signals is taken in turn. Thus, the outputs from the gates 228/1–228/5 and the outputs from the gate 229/1–229/5 which all taken together constitute the line 36, are led to a signal group generator 300. This has a single output line 42, along which signals in series are transmitted from the signal group generator in response to the input of characters composed of signal elements in parallel.

Operation of the signal group generator is actuated by an element sequence control 301. This latter has eleven output lines 302, ten of which, 302/1–302/10 lead to the signal group generator 300, and the eleventh of which, 302/11 leads directly to a parity checker 305.

In the signal group generator, as will be seen from FIG. 24, the output from gates 229/1–229/5 are taken to gates 308/1–308/5, and the outputs from gate 228/1–228/4 are taken to gates 308/6–308/10. The gates 308/1–308/5 are controlled respectively by signals appearing on the lines 302/2–302/5 and a branch 302/6a of the line 302/6 from the element sequence control 301. The gates 308/6–308/10 are controlled respectively by signals appearing on a branch 302/6b of the line 302/6 and the lines 302/7–302/10. The outputs of the gates 308/1–308/4 and 308/6–308/9 are taken to a gate 310 for transmission of signals therethrough to the transmission line 42. In addition, the line 302/1 from the element sequence control 301 is taken directly to the gate 310 for use in sending signals indicating the start of the transmistton of a character.

The element sequence control 301 receives 110 baud pulses on the input line 40, these pulses being received whenever a gate 311 is opened in response to a signal on the line 41 from the Operation Control 21. The element sequence control is constructed so as to emit one or more pulses in turn on each of the output lines 302/1–302/11. In this manner, the gates 308/1–308/10 are opened in strict sequence.

The parity checker 305 connected to the signal group generator 300 is illustrated in more detail in FIG. 25. This has input lines 312/1–312/10 taken respectively from the outputs of gates 308/1–308/10. As will be seen, the lines 312/1–312/5 carry the code for one character, while the lines 312/6–312/10 carry the code for a second character. Accordingly, these two sets of five input lines are formed into two separate groups, being taken respectively to gates 313 and 314. The outputs of these gates are taken in turn to Odd Even indicators 315 and 316 respectively, which indicators check one character appearing on the respective input lines for odd or even parity. In the form of character encoder illustrated, all the characters should be provided with odd parity. Thus provision is made for an alarm which is actuated if either of the indicators 315 or 316 indicate receipt of a character having even parity. In such an event, a signal is passed through either of gates 317 or 318, as the case may be, to a further gate 319 the output of which is connected to an alarm 320. The gates 317 and 318 are opened on receipt of a group end pulse along the line 302/11 from the element sequence control 301. This group end pulse is passed to a gate 332, which gate is opened when a signal is received on the line 38 from the transmission character control 20. This signal is the same as that passed along the line 204 to the block check generator 227, as described above.

The parity checker also includes a delay unit 325 which receives the group end pulse from the line 302/11 and stores it temporarily. After sufficient time has elapsed for the alarm 320 to be set off in the event of an even character appearing the delay unit 325 releases the stored group end pulse to the indicators 315 and 316 and thereby resets them to zero.

The Printing Character Control 21 is illustrated in FIG. 26. This corresponds substantially to the Transmission Character Control 20 illustrated in FIGS. 19(a) and 19(b), but is in some respects simplified. Accordingly, units in the Printing Character Control corresponding to similar units in the Transmission Character Control are designated with a number 200 higher than the corresponding unit of the Transmission Character Control, i.e., the final two digits are the same and the initial digit is "4" instead of "2." The operation of the Printing Character Control is exactly as that of the Transmission Character Control, except for the following modifications. In the transmission character selector 200, each set of data is fed to one position, which position has a single outlet leading to a single character releaser 203. Each set of data fed to the printing character selector 400 is allotted to a different position, but each position has two outputs, such as lines 402′, 402″, each such line being controlled by a separate character releaser, such as 403′, 403″. Each pair of lines from any one position is arranged to carry a control character on one and basic character on the other. Accordingly the printing character encoder 408 has eight outlets suitable for two quartets of binary signal elements one of which, on outlet lines 424/1–424/4, leading to gates 428/1–428/4, form a control quartet and the other, on outlet lines 425/1–425/4, leading to gates 429/1–429/4, form a basic quartet. The character encoder 408 is illustrated in FIG. 27, from which it will be seen that no parity elements are included, and that there are therefore no lines corresponding to the lines 224/5 and 225/5. Furthermore, there is no need for a unit corresponding to the block check generator 227 for totalling signal elements, since no transmission is involved. This means that no corresponding line is included in the Printing Character Control corresponding to the Transmission Character Control line 204. It will be noted that as before the outputs of character releasers joined to positions in the character selector with coded outputs (on four wires as there is no parity check) by-pass the character encoder and are taken directly, as in the case of lines 412‴ and 412⁗ illustrated, to the gates 428/1–428/4 and 429/1–429/4.

In the Transmission Character Control the group sequence control 209 is actuated by pulses on the line 35. These pulses are only transmitted when the gate 311 in the Transmission Element Serialiser is opened as a result of a signal on the line 41 from the Operation Control 31. No unit corresponding to the Transmission Element Serialiser 37 is required on the printing side, since the output of the printing character control 21 is taken directly to the printer 15. Accordingly the Printing Character Control 21 includes a gate 435 for passing or emitting pulses on the input line 49 under the control of signals on the line 50 from the Operation Control 31.

The construction of the printing character encoder 408 follows substantially the same lines as that of the transmission character encoder 208, except that the printing code is one suitable for use with a teleprinter, and is generally quite different from that chosen for use with the computer. Typically, the printing character encoder may be designed to convert the data into the ASCII code, and the connections between the gates 428/1–428/4 and 429/1–429/4 and the lines 420/0–420/15 and 421/0 and 421/15 will accordingly differ from the connections made between the corresponding parts of the transmission character encoder 208.

The Operation Control 31 is illustrated in FIG. 28. The purpose of this is primarily to control the operation of the Transmission Character Control 20 and Transmission Element Serialiser 37 on the one hand, and of the Printing Character Control 21 on the other. Such control is effected through signals on the lines 41 and 50 respectively as described above.

When the apparatus is switched on by closing the switch 72, a voltage appears on the line 71 which leads to a gate 500 connected to a flip-flop acting as a setting up control 501. The setting up control also has an input taken from a further gate 502, and it has two output lines 504 and 505 for carrying signals indicating respectively that the setting up control is in the ready position and that it is in the block complete position. Signals may be passed to the gate 502 either along the message start line 29, which is controlled by a gate 506 or along the line 70 leading from the block complete button 16, the line 70 being controlled by a further gate 507. The gate 500 may also receive signals from a clearance signal generator 510 along a line 511. The clearance signal generator is actuated to send a signal representing the clearance of a block of data by a transmission flow signal along the line 41′, a printer flow signal along the line 50′, a transmission end signal on the line 39 or a printing end signal on the line 51.

The setting up control 501 is so that the flip-flop goes over to the Ready position on receipt of a signal from the gate 500. As indicated, this may occur either on switching the apparatus or after clearance of a previous block of data. With the setting up control 501 in the Ready position, a signal is passed on the output line 504 to one of a plurality of indicator lights in a panel 520 (see FIG. 2) which are visible to the operator when sitting at the console. The line 504 also leads to a gate 514, which is controlled by signals appearing on the line 33 from the Data Setting Up unit 19 caused by the setting up of characters. When the gate 514 is opened as a result of the setting up of characters, the signal on the line 504 passes to an output line 515 of the gate 514 to illuminate a further light in the panel 520 representing the setting up of characters.

A message start block is automatically transmitted by the apparatus as soon as a data button is pressed, and accordingly the pressing of this button immediately creates a "Block Complete" signal. However, to cope with the possibility that the Message Start button is accidentally pressed during the course of a transaction, the line 29 is arranged to be inhibited by the gate 506 throughout the setting up of any transaction. This inhibition is effected by a voltage from a flip-flop acting as a message start control 543 and carried by a line 544 passing through a delay circuit 545. Thus when a voltage appears on the message start line 29 at the beginning of a message the flip-flop of control 543 is switched to emit the voltage on line 544. Owing to the delay circuit 545, however, the gate 506 is not immediately closed, and the voltage on line 29 can therefore pass to the gate 502 and thence to the control 501 switching its flip-flop to the "block complete" position. Having allowed sufficient time for this the delay then passes the voltage on line 544 to the gate 506, to inhibit thereby passage of further signals on the line 29. The inhibition is removed only on sending a "message end" signal on line 32, which switches the flip-flop of control 543 to a rest position, with no voltage appearing on the line 544.

Whenever a block is complete, or whenever alpha numeric information is being set up, this is indicated to the terminal transmission control 67 and the printing control 68 so that these may then allocate a transmssion line (or paper tape punch) and a printer respectively and, after such allocations, release the data to them. Pressing of the alpha start buttons of keyboard 13 causes a signal to appear on a line 516 leading to an alpha numeric control 522 formed by a further flip-flop. A signal on line 516 causes the alpha numeric control to emit a signal on the line 523, which leads to a gate 525. A lead is also taken off the line 523 to cause the illumination of a light in the panel 520 indicating the setting up of alpha numeric information. The alpha numeric control 522 also has an input for signals on a line 518 representing Alpha End. Signals on the line 518 cause the flip-flop in the alpha numeric control 522 to go over to the rest position, with no voltage appearing on line 523.

If the Message Start button is operated with the message start control 543 in the rest position, a signal will appear at the gate 502. Similarly, if the "block complete" button 16 is operated, a signal will likewise appear at the gate 502, provided the gate 507 is open. The gate 507 is controlled by signals appearing on the line 523 from the alpha numeric control, and is arranged to inhibit the "block complete" signal when alpha numeric information is being set up. In this way, a block of data is prevented from becoming mixed with data coming from the alpha numeric keyboard.

A signal appearing at the gate 502 causes the flip-flop in the setting up control 501 to move from the Ready position to the "block complete" position, the signal on line 504 ceases, and one is emitted on line 505, being taken to the gate 525. It will be noted that a lead is taken from the line 505 to cause the illumination of another light in the panel 520 to indicate that a block is complete.

A signal appearing at the gate 525 is passed via the line 65 to the Terminal Transmission Control 67. The line 65 is also connected to a gate 528, the output of which is connected through the line 66 to the Printing Control 68. It will be noted that signals may also appear at the gate 528 from the line 30. Signals on this line are caused by operation of the Day Start button of keyboard 13.

When the Terminal Transmission Control receives a signal on line 65, it allocates either a transmission line or a line to a paper tape punch to the apparatus and a signal indicating this has been done is passed on the output line 58. If a transmission line is allocated a further signal is emitted on line 59 if it is available for immediate use. The line 58 forks into three branches two of which are taken to gates 547 and 548, both of which are controlled by branches of the line 59. However a voltage on line 59 causes gate 547 to open and gate 548 to close. Thus if a transmission line is allocated and is available for immediate use the voltage on line 58 is allowed to pass through gate 547 giving a signal on the line 61 causing the gate 45 [FIG. 16(b)] to pass the coded signals to the computer. Conversely, when the transmission line is not available for immediate use, gate 548 is open and gate 547 is closed. The voltage on line 548 thus gives a signal on the line 62 causing the gate 45 to pass the coded signals to a paper tape punch. The third branch of the line 58 forms the transmission flow line 41 leading to the Transmission Element Serialiser 37 and the gate 53 controlling the output from the alpha numeric keyboard 14. Signals thus pass on the line 41 irrespective of the availability of a transmission line.

The Printing Control 68 on receipt of a signal on the line 66 determines whether the printer is available, and if this is so it emits a signal on the line 57. This is connected to the line 50 leading to the Printing Character Control 21.

The line 69 leading from the Printing Control is used to cause illumination of a further one of the lights in the panel 520 whenever a message from the computer is being received. In these circumstances, the Printing Control 68 delays the emission of a signal on the line 57 until the computer message is completed. It will also be noted that lines 57′, 61′ and 62′ are taken from lines 57, 61 and 62 respectively to cause illumination of additional lights in the panel 520 as appropriate, indicating respectively the allocation of the printer, the allocation and availability of a transmission line, and the allocation of the paper tape punch.

The keyboards 3–13 of the apparatus described each contain up to sixteen separate outlet lines, and normally a single line is energised on actuation of any one button. The output of the console 1 accordingly consists of a large number of different groups of output lines. With an alternative construction of keyboard there can be appreciably fewer output lines to each group and/or fewer groups. In this alternative construction, the operation of any one button causes a unique selection of a group of, e.g., twelve output lines to be energised, enabling a very much greater number of characters to be set up on the one group of lines. With such a system certain parts of the apparatus described above may be substantially simplified or even eliminated.

A suitable form of coding switch that may be employed in this alternative system is illustrated in FIGS. 29 and 30. This has a body 601 of insulating material, from the underside of which project a set of coding pins 602, a power source pin 603 and an earth pin 604. The upper surface of the switch is formed by a tablet 605 mounted on the body 601 through springs 606. On the underside of tablet 605 is a metal contact plate 607 which is normally spaced apart from the remainder of the body 601 through the action of the springs 606. Seated in a recess 608 in body 601 is a further metal plate 609. The recess 608 and plate 609 are disposed so as to lie over the pins 602, and a set of twelve holes 610 shaped to receive the heads of countersunk screws, are formed in the plate 609 such that there is a hole 610 immediately over each pin 602.

Each of the pins 602 extends from an internally threaded metal socket 611 fixed within the body 601. Accordingly screws of a suitable length to engage the internal threading in the socket 611 can be inserted through the holes 610 and tightened until their heads are in good electrical contact with the metal plate 609. In practice, only certain of the holes 610 will normally be occupied by screws, and in the embodiment of FIG. 29, the hole 610′ has no screw, and consequently there is no electrical connection between the corresponding pin 602′ and the metal plate 609.

The contact plate 607 extends over the metal plate 609, which latter is arranged to lie in the same plane as the upper end of the power plug pin 603. Consequently, on depressing the tablet 605 against the action of the springs 606, the contact plate 607 forms a bridge, electrically connecting the power plug pin 603 to the metal plate 609 and thence to such screws 612 as are present and so to the corresponding pins 602.

The attachment of the tablet 605 to the body 601 through the springs 606 is so devised that the tablet can be readily removed, if desired, to expose the metal plate 609 and the heads of screws 612. It is thus a simple matter to remove one or more of the screws 612 and to insert other screws into unoccupied holes such as hole 610', whereby a different combination of the twelve pins 602 is connected to the power plug pin 603 on depression of the tablet 605. The purpose of so altering the combination will be explained below.

The tablets of a keyboard of such coding switches should be suitably inscribed to indicate the code of each switch and/or its significance. Clearly any such inscription should normally be easily altered to allow for any variation of the code that may be made.

FIG. 31 illustrates part of a data collection apparatus designed to received a pair of coding switches of the type illustrated in FIGS. 29 and 30. For each set of coding pins 602 there is a corresponding set of sockets arranged in three rows $a$, $b$ and $c$ of four sockets, 621a, 622a, 623a, 624a, 621b, 622b, 623b, 624b, 621c, 622c 623c, and 624c. In addition sockets 625 and 626 are provided to receive respectively the power pin 603 and earth pin 604.

These sockets are formed in a fascia 620 of the data collection apparatus (FIG. 32) which is laminated to three layers 627, 628 and 629, each of which has a printed electrical circuit on its upper surface. The laminate layers are supported on a base plate 630 in which the various sockets 621a–624a, 621b–624b and 621c–624c terminate.

One layer 627, and its associated printed circuit is illustrated in FIG. 33. In this layer the sockets in the first rows $a$ i.e. 621a–624a and 621a'–624a' are connected to a series of bus-bars 631a, 632a, 633a and 634a. A further bus-bar 635 is provided leading to the power pin sockets 625 and 625'. The printed circuit of laminate 628 is illustrated in FIG. 34, where it will be seen that a second series of bus-bars 631b, 632b, 633b and 634b respectively connect the sockets 621b to 621b', 622b to 622b', 623b to 623b' and 624b to 624b'. The printed circuit of laminate 629 illustrated in FIG. 35 is similarly arranged, but this time so as to connect the sockets of the rows $c$ by means of bus-bars 631c–634c. Laminate 629 also contains an additional bus-bar 636 connecting the earth pin sockets 626 and 626'.

In apparatus designed to receive coding switches having twelve coding pins, as in the embodiment illustrated, in the FIGS. 29 and 30 the total number of unique combinations that may be formed with the screws 612 is $2^{12}-1$, that is 4,095. The data collection apparatus, therefore may be constructed to receive up to 4.095 separate coding switches in 4,095 separate sets of sockets all of which are connected to a single group of twelve output lines. In each of these sets the relative arrangement of sockets will be the same, and every socket of each set will be connected to the corresponding sockets of the other sets through bus-bars such as bus-bars 631a–634a, 631b–634b, 631c–634c, 635 and 636. In practice the sockets are arranged into a number of groups, providing a variety of keyboards each of distinct significance, as illustrated in FIG. 1.

It will now be seen that when the data collection apparatus is provided with a plurality of coding switches each of which has a unique arrangement of the screws 612, on operation of any one of the coding switches a unique combination of the bus-bars 631a–634a, 631b–634b and 631c–634c will be energised through a connection to power source bus-bar 635. For the information provided by this unique combination of energised bus-bars, a system must be provided for reading the output of each one in a predetermined order to detect the presence or absence of a signal at each. A system for doing this is illustrated in the block diagram of FIG. 36. A row of twenty gates 640, 640a, 640b, 640c, 641, 641a, 641b, 641c, 642, 642a, 642b, 642c, 643, 643a, 643b, 643c, 644, 644a, 644b and 644c are provided, controlled by a sequence controller 638. Bus-bar 631a is connected to gate 641a, bus-bar 631b is connected to gate 641b and so on, the final bus-bar 634c being connected to gate 644c. The bus-bars are also taken to a class selector 645 which has an outlet along a line 646 connecting it with the sequence controller 638. The class selector also includes a connection along a line 648 along which a voltage can be passed to one or more of the gates 640, 641, 642, 643 and 644. In the particular embodiment illustrated in FIG. 36, the gates 640, 641, 643 and 644 receive any voltage on line 648, and as will be seen hereafter this combination of gates may be made unique to the particular class selector and hence to the particular bank of bus-bars from which a signal is being received at the signal input. This enables the apparatus to be used in combination with one or more further banks, so that two or more different classes of information may be associated at the output of the data collection apparatus.

The gates 640–644c are connected to a signals collector 649 having collecting lines 650, 651, 652, 653 and 654, and their output lines are grouped together so that gate 640 is taken to line 650, gates 641–641c to line 651, gates 642–642c to line 652, gates 643–643c to line 653 and gates 644–644c to line 654. The signals collector 649 has five separate outputs 655–659 corresponding to the lines 650–654 and these may be taken to a Transmission Element Serialiser such as illustrated in FIG. 23 for onward transmission to a transmission line or a paper tape punch, or the outputs 655–659 may be taken directly to a printer.

The sequence controller 638 is built up of four stages 638A, 638B, 638C and 638D having output lines A, B, C and D respectively. Line A is taken to gates 640, 641, 642, 643 and 644, line B to gates 640a–644a, line C to gates 640b–644b and line D to gates 640c to 644c. The first stage 638A is activated on a signal being received from the class selector along lines 646 and 647, and a pulse is transmitted along line A so as to open the gate 640 to 644. As noted above, gates 640, 641, 643 and 644 are connected to the line 648 from the class selector, and on their being opened the voltage on line 648 is passed through to line 650, 651, 653 and 654 in the signals collector 649. After a predetermined interval, stage 638A of the sequence controller is deenergised, and stage 638B is activated so that gates 640–644 are closed and a pulse is transmitted along the line B to open the gates 640a, 641a, 642a, 643a and 644a. There is no other connection to gate 640a, but as already noted bus-bars 631a–634a are connected to the gates 641a–644a respectively. Consequently any voltages on these particular bus-bars are transmitted through to lines 651–654 in the signals collector 649 and thence to the lines 656–659. Again, after a predetermined interval, stage 638B of the sequence controller is deenergised, and stage 638C activated. This time, gates 641a–644a are closed and gates 641b–644b are opened to transmit any voltages on bus-bars 631b–634b to lines 651–654 of the signals collector 649, and thence to the lines 656–659. Finally, after a further interval stage 638C of the sequence controller is deenergised and stage 638D activated so that gates 640b–644b are closed and gates 640c–644c are opened permitting any voltages on bus-bars 631c–634c to be transmitted to lines 651–654 of the signals collector and thence to the lines 656–659. When this process has been completed, stage 638D of the sequence controller is also deenergised, and no further voltages will be transmitted along lines A–D until a further signal is received at its input line 647.

The description of FIGS. 29 to 36 has been devoted to the operation of a single bank of sets of sockets in data collection apparatus. However, as previously explained, information from two or more banks is to be associated, and in such a case these may operate in substantially the same way, but it will be appreciated that these need not necessarily have the same information capacity. Thus the number of coding pins in the coding switches and the number of sockets to each set and the number of bus-bars may vary from one bank to another. Normally there will be at least four coding pins, as this is the minimum number that permits sufficient unique combinations to denote all the digits from 0 to 9. Since, however, this invention is of particular value where a large quantity of standard information is to be readily accessible the number of coding pins to a switch will normally be at least eight and generally at least twelve.

FIG. 36 shows in outline how the information from two additional banks is associated with information from the bank illustrated in the drawings. Each of the banks have a class selector such as class selector 645, and there are consequently three lines 646, 646' and 646" which are joined to the input line 647 of the sequence controller 638. Similarly, each bank has a set of gates corresponding to the gates 640–644c, and all these gates are connected to the sequence controller 638 for selective opening of a selection from them. Each class selector also has a connection line, corresponding to the line 648, leading to its own unique combination of gates to control outputs to gates 640, 641, 642, 643 and 644. The outputs from the gates are thus combined into the lines 650–654, 650'–654' and 650"–654" for onward transmission to the output lines 655–659.

In the above description of FIGS. 29–36 the coding switches take the form of self-contained units which can be plugged in or otherwise connected to the data collection apparatus. However it is not essential that the switches be readily separable from the apparatus. For example each switch might be fixed and have a removable insert which could be suitably adjusted or disposed differently in relation to the switch to change the code.

A particular advantage of the coding switch described in FIGS. 29 to 30 is the fact that the code is adjustable by the operator by will though it will be understood that this facility may well be unnecessary in certain applications. By "adjustable at will" is to be understood that the particular combination of coding contacts connected to the power source contact in use may be altered by a simple manual operation including for example the use of a screwdriver to insert or remove screws as opposed to more complicated techniques such as the use of a soldering iron that require an element of technical skill. The operator of the apparatus is thus able himself to adjust the individual coding switches as desired to effect any proposed change in the list of data represented by the coding switches.

The data collection apparatus of the type described in connection with FIGS. 31 to 36 may include provision for a single modified form of coding switch in place of an entire keyboard of separate switches. Such a modified coding switch may contain a contact for connection to the power source and selector means for connecting the power source contact to a selection of the coding contacts from which the bus-bars 631a–634c originate. This selector means is controllable by a removal preset coding member for determining which of the said bus-bar contacts are connected to the power source when in use. This modified coding switch thus makes possible a data collection system that is simpler in some respects to that already described, in that each item to be separately identified requires only a unique identifying code member which may for example be just a punched card, and not an entire switch.

In the block diagram of FIG. 36, the various banks, whose inputs appear on the lines 646, 646' and 646", are identified by each being allotted a different code. However it will be understood that it is not essential for such a code to be formed; it may be sufficient, where there are only two banks to be associated to distinguish the signals of one bank, from those of the other by giving odd parity to the signals of the first bank and even parity to those of the second. Alternatively one of the five output lines 655–659 may carry a signal for every character stemming from the first bank, and may remain unenergised for every character stemming from the second bank.

It will further be understood that it is not essential to include in the apparatus either parity determining means or coding means for distinguishing between the banks, as the operator himself can, if desired, press a key which causes a unique signal to be transmitted to indicate that the following signals represent items from one bank rather than those from the other. As yet a further alternative, where there are two or more banks the outputs lines 655–659 may be fed to a Transmission Character Control such as that described and illustrated in FIGS. 19(a) and (b)–22. Such a selector can be operated in conjunction with format means, as described, so as to allot certain positions in the selector 200 according to the banks from which they originate, or, in simpler apparatus, the operator himself can set up the data in a predetermined order, each set of data being stored in a different position in the selector 200, the position being occupied in strict sequence, so that when the stored data are read in the fixed sequence determined by the Transmission Character Control the computer correctly interprets the meaning of each set.

It will be seen that this invention may of universal application to all concerns having a variety of different types of standardised information that require to be associated in various different types of transactions. The application of the data collection apparatus is very flexible, and the keyboards can be arranged close together or disposed over a wide area as desired. A special advantage of the invention is that in spite of the variety of facilities it offers, it is built up of standard components that may be readily manufactured and simply assembled.

What is claimed is:

1. Data collection apparatus comprising at least one bank of sets of contacts, each said set in any one bank having the same number and relative arrangements of contacts, every contact of each set being electrically connected to the corresponding contacts of the other sets to form a plurality of groups of corresponding contacts, a plurality of signal lines, each of said signal lines being electrically connected to different ones of said groups of corresponding contacts, and reading and coding means in electrical connection with the said signal lines for reading the signal lines in a predetermined order to detect the presence or absence of a voltage on each, and an output for said reading means for passing signals representative of characters on the signal lines as determined by the presence or absence of a voltage thereon.

2. Data collection apparatus according to claim 1 comprising a plurality of said banks of sets of contacts and wherein the reading and coding means is adapted to form coded signals uniquely representative of each bank whereby characters from different banks may be distinguished.

3. Data collection apparatus according to claim 1 in combination with an adjustable switch and wherein each set of contacts includes a power source contact, the said switch being adjustable at will to determine which of said contacts are connected to the power source contact in use.

4. Data collection apparatus according to claim 1 wherein the sets of contacts are adapted to receive a removable switch member.

5. A coding switch for use in data collection apparatus comprising an insulating body, a power source contact and a plurality of coding contacts supported by said body, connector means held adjacent said body for connecting the power source contact to at least one of said coding contacts, and adjustable means cooperable with the connector means and the coding contacts for determining which of the said coding contacts are connected to the power source contact in use.

6. A coding switch according to claim 5 wherein the adjustable means comprises at least one insert and the coding contacts are each adapted to receive said insert.

7. Data collection apparatus for encoding and storing information to be supplied to a central station, the apparatus comprising
  a plurality of signal lines,
  a plurality of actuating devices for generating in said signal lines electrical input data signals corresponding with said information,
  storage means operably connected to said signal lines and having a plurality of storage positions,
  switch means, operably connected with said storage positions and with at least a first of said signal lines, said switch means being operable, in response to electrical input data signals generated in at least said first signal line, to route the electrical input data signals to selected storage positions to be stored thereat,
  reading means operably connected to said storage means for sequentially reading said storage positions and extracting any of said electrical input data signals stored thereat as a block of electrical signals, and
  coding means for encoding said block of electrical signals into coded output signals,
  whereby a data signal generated by a given actuating device can be controlled to have differing significances depending upon the storage position to which it is routed, thereby economising in the number of actuating devices required, and
  whereby said coded output signals correspond to said information to be supplied to said central station.

8. Apparatus according to claim 7 wherein said switch means comprises format means and gating circuit means, said format means being operably connected with said first signal line and with said gating circuit means, said gating circuit means being operably connected with said storage positions and with said signal lines, said format means being operable to produce electrical output signals in accordance with input data signals generated in said first signal line, said output signals controlling said gating circuit means to perform said routing operation.

9. Apparatus according to claim 7 wherein certain of said actuating devices are each adapted to produce input data signals representative of one of a plurality of groups of data entities, said groups being stored in a storage device connected with display means, said storage device and said display means being operable in response to the operation of any one of the said actuating devices to cause the group of data entities, of which the said operated actuating device is representative, to be displayed on the display device in such a manner that the data entities displayed indicate which of other actuating devices must be operated to generate an input data signal on the signal lines representative of any given one of the data entities.

References Cited
UNITED STATES PATENTS

| | | | |
|---|---|---|---|
| 3,080,457 | 3/1963 | Jansson et al. | 200—5 |
| 3,156,898 | 11/1964 | Avery et al. | 340—172.5 |
| 3,293,640 | 12/1966 | Chalfin et al. | 340—365 |
| 3,307,156 | 2/1967 | Durr | 340—172.5 |
| 3,436,735 | 4/1969 | Hoiseth | 340—172.5 |

RAULFE B. ZACHE, Primary Examiner